(12) United States Patent
Sadowski et al.

(10) Patent No.: US 6,536,722 B2
(45) Date of Patent: Mar. 25, 2003

(54) PRESSURE VESSEL MOUNTING SYSTEM

(75) Inventors: Mark M. M. Sadowski, Calgary (CA); Ulrich Imhof, Calgary (CA); Jeffrey J. Sharp, Cohrane (CA)

(73) Assignee: Dynetek Industries Ltd., Calgary (CA)

( * ) Notice: Subject to any disclaimer, the term of this patent is extended or adjusted under 35 U.S.C. 154(b) by 0 days.

(21) Appl. No.: 10/137,414

(22) Filed: May 3, 2002

(65) Prior Publication Data

US 2003/0006349 A1 Jan. 9, 2003

Related U.S. Application Data

(60) Provisional application No. 60/288,488, filed on May 4, 2001.

(51) Int. Cl.[7] .............................................. A47G 23/02
(52) U.S. Cl. ....................................... 248/154; 248/201
(58) Field of Search ................................ 248/154, 312, 248/312.1, 313, 201; 180/69.5; 280/834

(56) References Cited

U.S. PATENT DOCUMENTS

| | | | | |
|---|---|---|---|---|
| 3,177,025 A | * | 4/1965 | Short | ........................ 215/396 |
| 5,810,309 A | * | 9/1998 | Augustine et al. | .......... 248/154 |
| 6,042,071 A | | 3/2000 | Watanabe et al. | |
| 6,053,533 A | | 4/2000 | Osborn et al. | |
| 6,220,557 B1 | * | 4/2001 | Ziaylek et al. | .............. 248/154 |
| 6,367,573 B1 | | 4/2002 | Scott | |

FOREIGN PATENT DOCUMENTS

JP   2001-163067 A   *   6/2002

OTHER PUBLICATIONS

Evolution of CNG Bus Fuel Systems by Tiller and Eihusen, Lincoln Composites, NGV'98 May 1998 Cologne Germany.

* cited by examiner

Primary Examiner—Ramon O. Ramirez
(74) Attorney, Agent, or Firm—Sean W. Goodwin

(57) ABSTRACT

A frameless system for mounting pressure vessels to a structure comprising fiber-reinforced (FRP) brackets and parallel brackets arranged orthogonally at each neck end of one or more pressure vessels. The brackets are stiff to accept inertial loads imposed by the pressure vessels and are flexible enough to permit longitudinal expansion of the pressure vessels. Each bracket preferably has a profile comprising a base, a tubular portion extending from the base and a web extending from the tubular portion. The pressure vessel's neck end is connected to the web through an attachment secured to the web which transfers loads from the pressure vessel into the bracket's web.

30 Claims, 23 Drawing Sheets

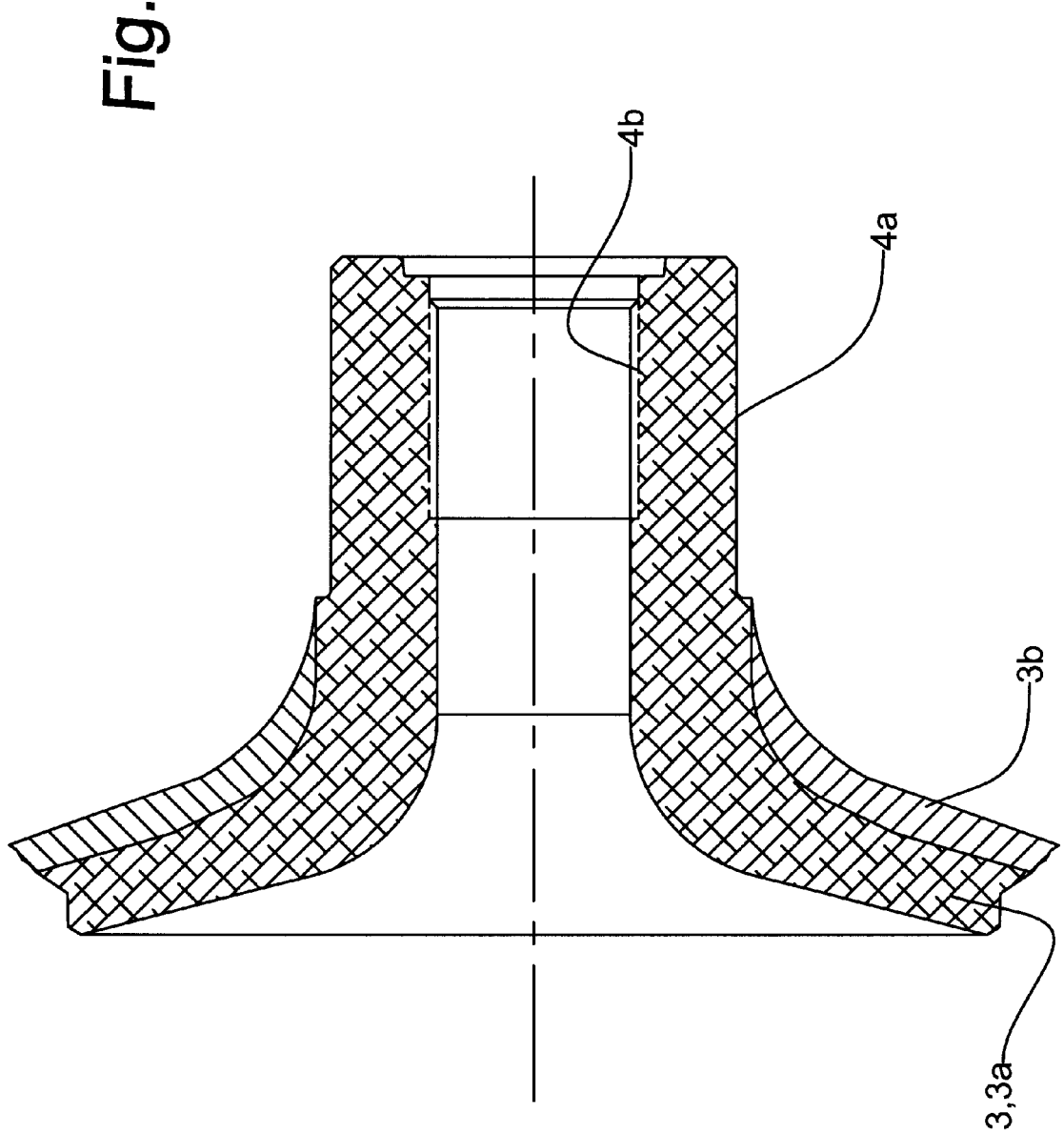

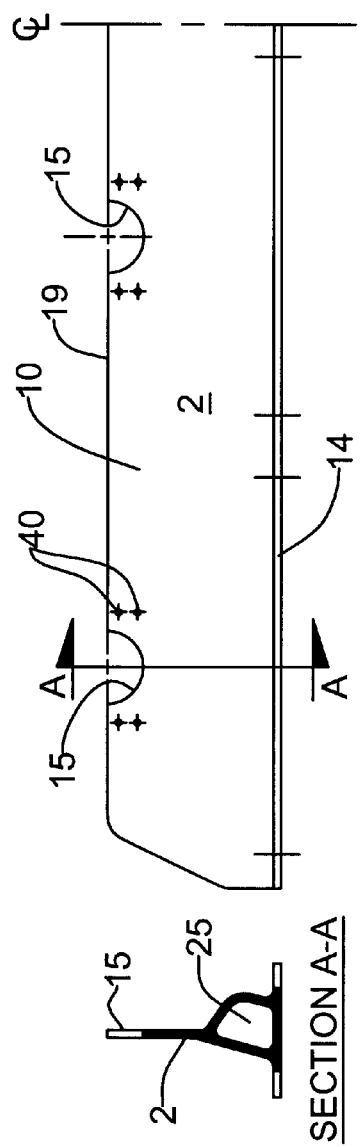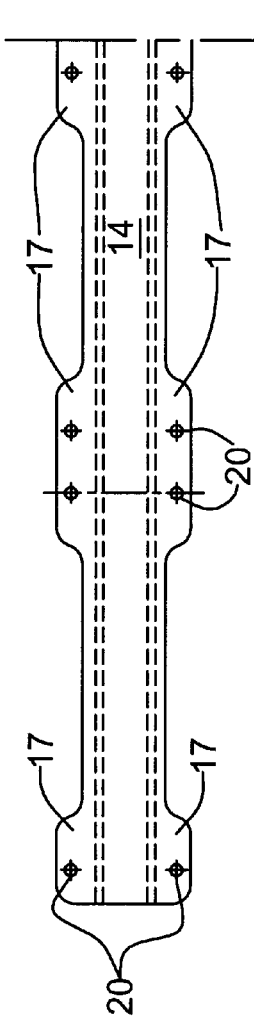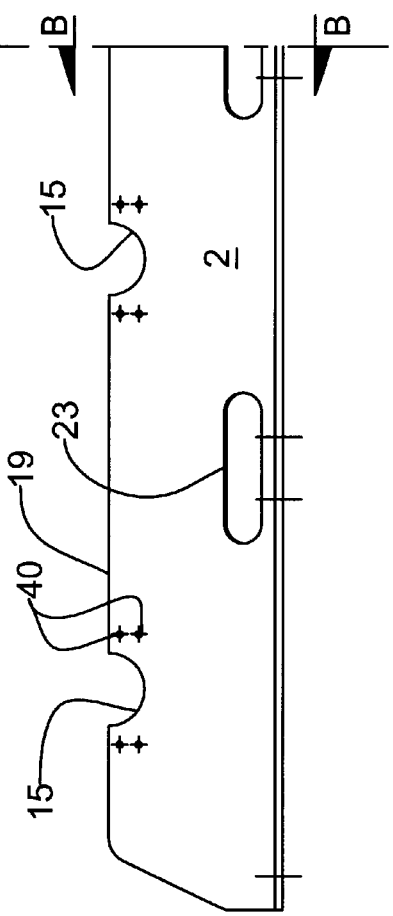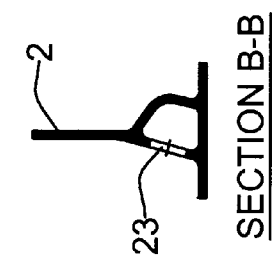
Fig. 3a
Fig. 3b
Fig. 3c
SECTION A-A
SECTION B-B

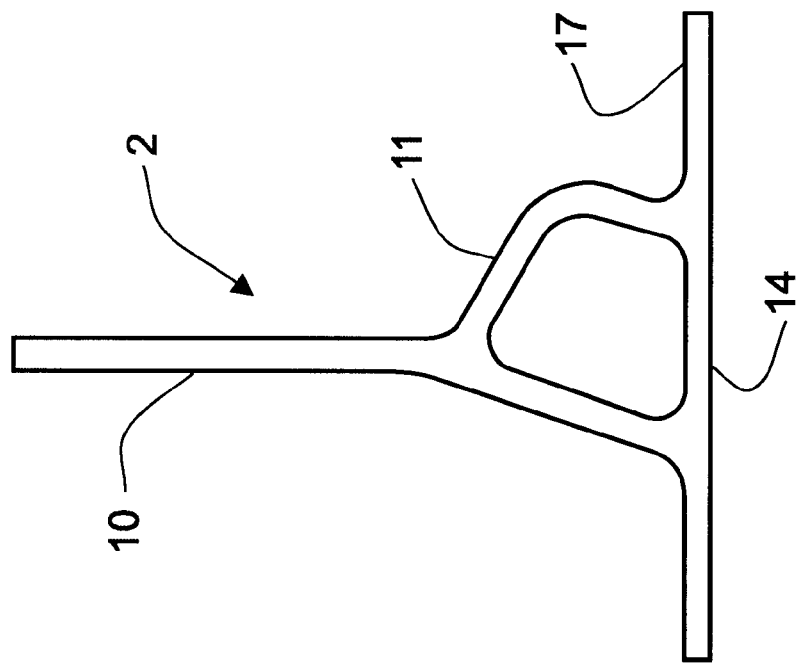
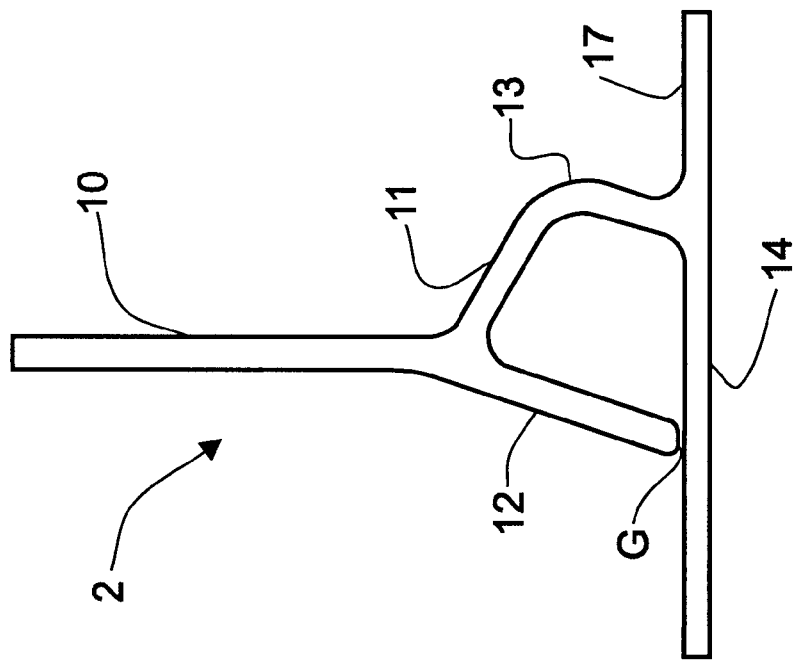

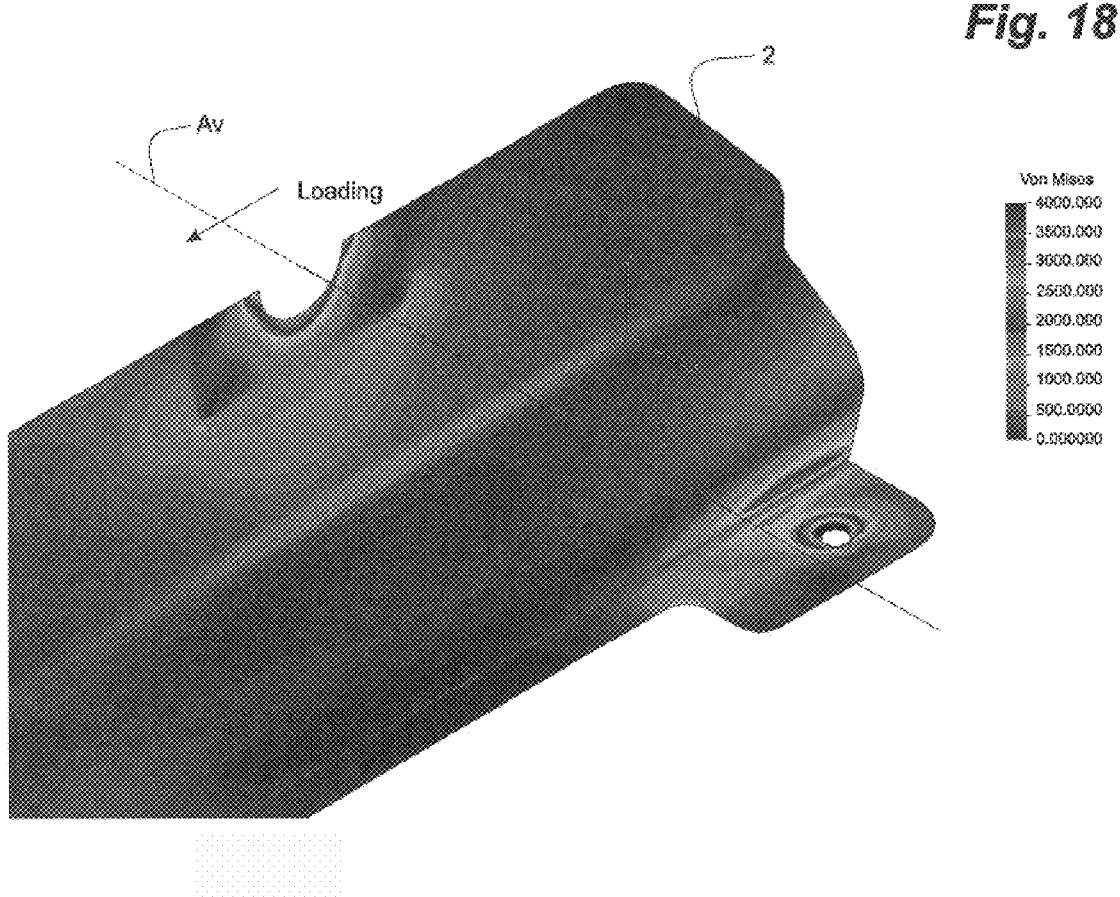

PRESSURE VESSEL MOUNTING SYSTEM

CROSS REFERENCE TO RELATED APPLICATION

This application is a regular application of U.S. Provisional Patent application Serial No. 60/288,488 filed on May 4, 2001, the entirety of which is incorporated herein by reference.

FIELD OF THE INVENTION

The present invention relates to fuel pressure vessel mounting systems and more particularly to roof mounted systems for supporting a plurality of fuel pressure vessels.

BACKGROUND OF THE INVENTION

The advent of low floor transit vehicles, such as buses, fueled by alternative fuels such as compressed natural gas (CNG), liquefied natural gas (LNG) or hydrogen, has resulted in the need to mount fuel storage in the form of pressurized vessels to the vehicle and preferably on the roof.

Typically, in order to achieve a driving range similar to diesel and to achieve safety standards associated with alternative fuels, a plurality of pressure vessels must be used. In order to reduce the weight of such fuel storage systems, lightweight composite pressure vessels and mounting systems are used.

In order to meet ANSI/AGA NGV2 and CSA B51 certification in both the U.S. and Canada, the mounting systems must be designed to accommodate radial and axial growth of the fuel pressure vessels as a result of pressurization of the pressure vessel and further, must withstand dynamic loading as a result of normal operation and in the event of a crash. The dynamic loads which must be safely restrained in the event of a crash are specified in terms of multiples of gravity. The loading design is dependent on the orientation of the vessel. In Canada, where pressure vessels are typically oriented in the same direction as travel of the vehicle, the design dynamic loading must be at least 20 g in the longitudinal direction of the vehicle and 8 g in any other direction. These loads supersede those required for normal operation and are generally more stringent than those imposed in the U.S., where vessels are oriented in the same direction. Further, a maximum allowable deflection of 0.5 inches (12.5 mm) for mounting brackets is required when tested at 8 g. When pressure vessels are mounted crosswise to the direction of travel, such as is the convention in Europe and Japan, the current design crash loads are 100 g in all directions. The standards periodically change.

In 1998, Lincoln Composites (Lincoln, Nebr., U.S.A.), a division of Advanced Technical Products, Inc., disclosed a modular concept for roof mounting utilizing a lightweight truss frame, expandable to accommodate various lengths of pressure vessels. Integration of the modules to the bus roof is accomplished by utilizing mounting brackets that can be relocated along the length of the modules to correspond with the roof "hard points". The modular frame comprises end frames spacing two rails and a plurality of truss-like central frame members running lengthwise in the same direction as the pressure vessels and separating the pressure vessels, thus adding structural rigidity to the frame.

Other frames have been designed to meet safety requirements and weight restrictions. One such known design is that used typically for roof-mounting in low floor buses comprising a frame structure of end members and cross members. The frame has steel straps at two places along each pressure vessel, clamping each pressure vessel into the frame.

In the Lincoln Composites system described above, pressure vessels are positioned with their longitudinal axis oriented in the same direction as the longitudinal axis of the vehicle. In other known frames, fuel cells are oriented with their longitudinal axis at 90 degrees to the frame rails and to the longitudinal axis of the vehicle. The differences in orientation of the pressure vessels are representative of differences in mounting conventions between North America and those in Japan and Europe.

The known mounting systems utilize multiple-component, complete and heavy frames into which pressure vessels are mounted.

Ideally, a roof-top mounting system must be lightweight, able to meet or exceed current safety standards, comprise a minimum of structural elements, allow easy access to one or more fuel pressure vessels or cells and allow mounting of pressure vessels of various sizes.

SUMMARY OF THE INVENTION

The present invention obviates the prior art requirement for heavy frames through a combination of a unique lightweight fiber-reinforced (FRP) bracket and incorporation of the fuel vessel as part of the overall structure for supporting the vessel. The brackets are capable of accepting dynamic inertial loads imposed by the vessels under acceleration. Acceleration, unless the context suggests otherwise, includes positive and negative acceleration; negative acceleration also being known as deceleration. While discussed herein in the context of a vehicle upon which the pressure vessels are mounted, the term vehicle is understood to relate to any structure capable of movement. The composite brackets are a lightweight and strong solution to providing a balance between being stiff enough to resist inertial loading yet flexible enough to permit longitudinal expansion of the pressure vessels. Expansion occurs through filling (pressurizing) and emptying cycles and through thermal expansion and contraction.

In one broad aspect of the invention, a system is provided for securing one or more parallel pressure vessels to a structure such as a vehicle. The system comprises one or more pressure vessels each having two opposing neck ends and having a longitudinal axis; a pair of fiber-reinforced composite mounting brackets to which the pressure vessels are mounted, each bracket being a unitary member having a base adapted for mounting to the structure, each bracket being positioned at each neck end of the one or more pressure vessels and having an axis which extends substantially perpendicularly to the longitudinal axis of the pressure vessels; and neck-mounting means for mounting each pressure vessel's neck end to each bracket, the one or more pressure vessels extending between the brackets so as to space the brackets apart and add structural rigidity to the system.

The broad system is effectively implemented using a novel bracket comprising a fiber-reinforced composite and unitary beam, the beam having an axis which is adapted to extend perpendicular to the axis of the pressure vessel, and further comprising a base adapted for mounting to the structure; a web extending from the base, the web receiving an attachment for mounting the neck end of each of the one or more pressure vessel so as to transfer load from the neck end of the pressure vessel into the web. Preferably the web is notched for accepting the attachment, the attachment comprising a body having a laterally extending profile for fitting correspondingly into the notch and a bore adapted for mounting to the neck end of the pressure vessel; the body being secured to the web.

The bracket and system enables implementation of a novel method for mounting one or more pressure vessels to a structure, most advantageously to a structure such as a vehicle which is subject to acceleration or inertia, the method comprising the steps of: providing first and second fiber-reinforced composite brackets, each bracket having a base from which a web extends and one or more attachments formed in the web; mounting a pressure vessel at a first neck end to an attachment of the first bracket and at a second end to an attachment of the second bracket so as to mount the pressure vessels to the brackets and to space the brackets apart so as to create a structurally rigid system; and mounting the spaced first and second brackets to the structure. The brackets are capable of accepting inertial loading from the pressure vessels while flexing under the pressure vessel differential expansion such as that experienced during fill and empty cycles.

BRIEF DESCRIPTION OF THE DRAWINGS

FIG. 2a is a partial and side cross-sectional view of a neck end of a pressure vessel suitable for mounting in the system;

FIGS. 3a, 3b and 3c are inside (back), base (bottom) and outside (front) views respectively of the bracket according to FIG. 2a;

FIGS. 11a and 11b illustrate alternate profiles of the bracket, one having a leg with a gap at the base and one with contiguous legs and base;

FIG. 18 is a Von Mises stress distribution for the distal ends of a bracket for the system of FIG. 17 under 10 g loading.

DETAILED DESCRIPTION OF THE PREFERRED EMBODIMENT

Figure 1A:
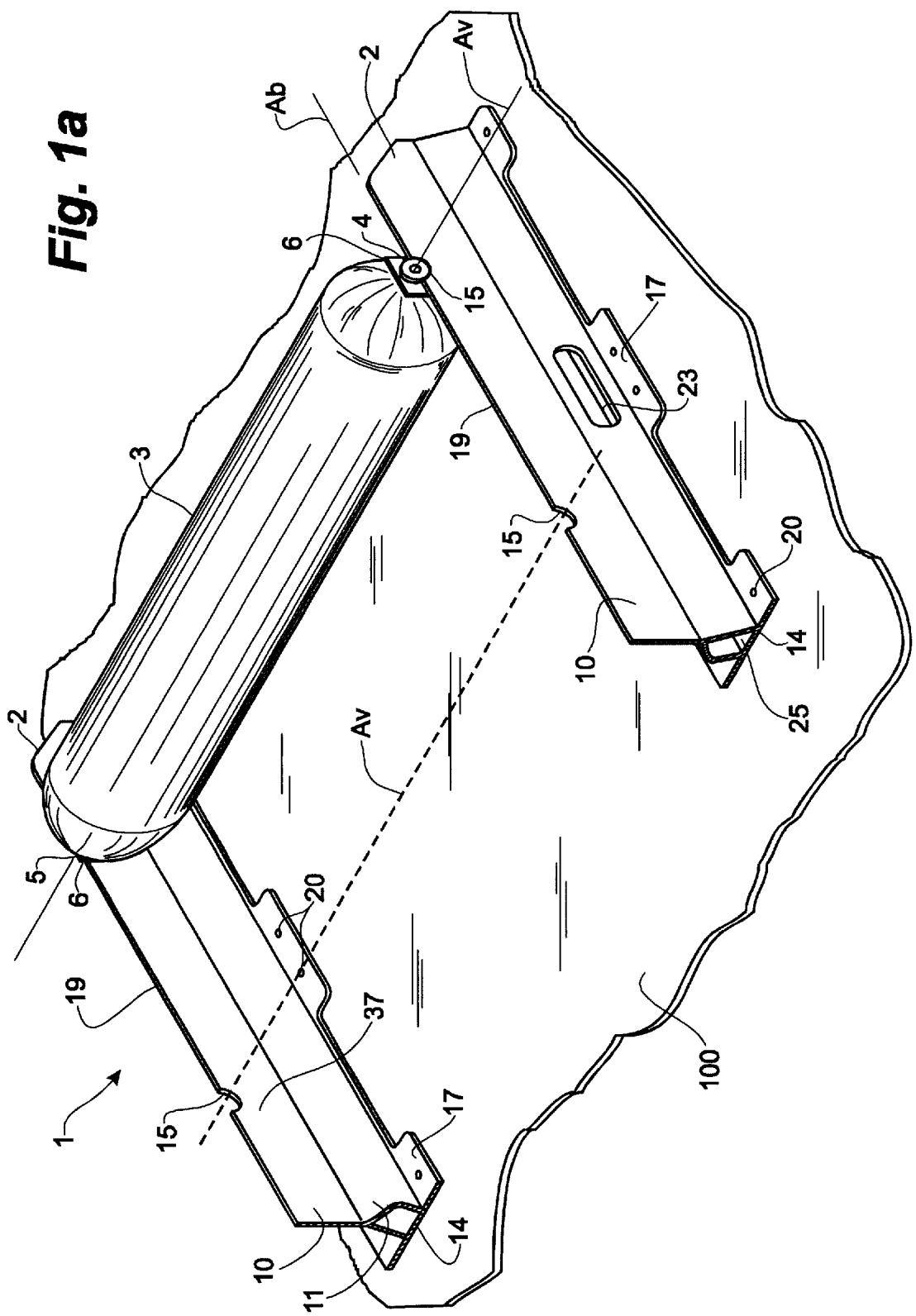
FIG. 1a is a perspective view of a portion of a mounting system of the present invention which integrates one or more pressure vessels (one shown) as an structural member between brackets mounted to a structure.

With reference to FIGS. 1a and 2a, a mounting system 1 of the present invention comprises a pair of brackets 2, positioned spaced apart by a one or more fuel pressure vessels 3. The brackets 2 have a base 14 which is mounted to a structure 100 and the pressure vessels 3 are mounted to a web 10 for forming an overall mounting system 1. The pressure vessels 3 and brackets 2 are positioned substantially orthogonally; the pressure vessels having a longitudinal axis Av and the brackets having a longitudinal axis Ab, the respective axes Av,Ab of the pressure vessels 2 and brackets 3 being substantially at right angles.

The brackets 2 are designed to be a part of a mounting system 1 having a variety of competing design characteristics including: fuel pressure vessels 3 are typically cylinders having hemispherical ends and having neck ends 4; that the pressure vessels 3 have an inherent stiffness which makes them candidates for contributing to the structural elements of the system 1; the neck ends 4 are used to mount the pressure vessels 3 into the system 1; the pressure vessels 3 and thus the system 1 are designed to accept pressure vessel differential expansion of about 0.1%, which is the typical variation between pressure vessel fill/empty cycles; the system 1 is designed for inertial loads imposed by the pressure vessels 3 themselves without undergoing excess displacement; and the system 1 is designed for a minimum number of fill/empty cycles, at least commensurate with pressure vessel life, without a reduction in performance.

The solution is to take advantage of utilizing lightweight composite materials for the brackets 2 in combination with the inherent stiffness of the pressure vessels 3 themselves. The brackets and vessels together replace the frames of the prior art. The bracket is a form of beam as are the vessels.

Each pressure vessel 3 is considered a structural member with adequate strength to support its own weight and inertial loads and thus can replace the conventional art's reliance on crossbeams in a frame. As a result, the number of structural elements in a mounting system 1 is reduced with a reduction in weight and a simplification of fabrication. As identified above, constraints on the design include that the bracket 2 is somewhat flexible in one direction (laterally to the bracket and along the pressure vessel's axis Av) to take up the linear differential expansion as well as being sufficiently rigid in the other two planes (along the bracket axis Ab, and perpendicular to the bracket axis towards the base) to provide structural support.

With reference also to FIG. 2a, one form of pressure vessel 3 is a fiber-reinforced pressure vessel having an aluminum liner 3a having a fiber wrap 3b with protruding aluminum neck ends 4. A typical profile of the aluminum liner neck end 4 includes a machined cylindrical outer surface 4a and a machined inner surface 4b. The inside surface 4b is usually threaded for accepting a valve or a plug. A series of different pressure vessels 3 meeting these general characteristics include those identified generally as models V or W series fuel storage cylinders from Dynetek Industries Ltd., or Calgary Alberta, Canada. These tanks are capable of neck-mounting. For instance, a model V cylinder is capable of resisting the axial force developed during inertial load resulting from a 200 kg cylinder under aggressive deceleration (vehicle braking or impact) conditions. Such stresses have been found not to cause permanent deformation in the cylinder neck ends 4.

Figure 1B:
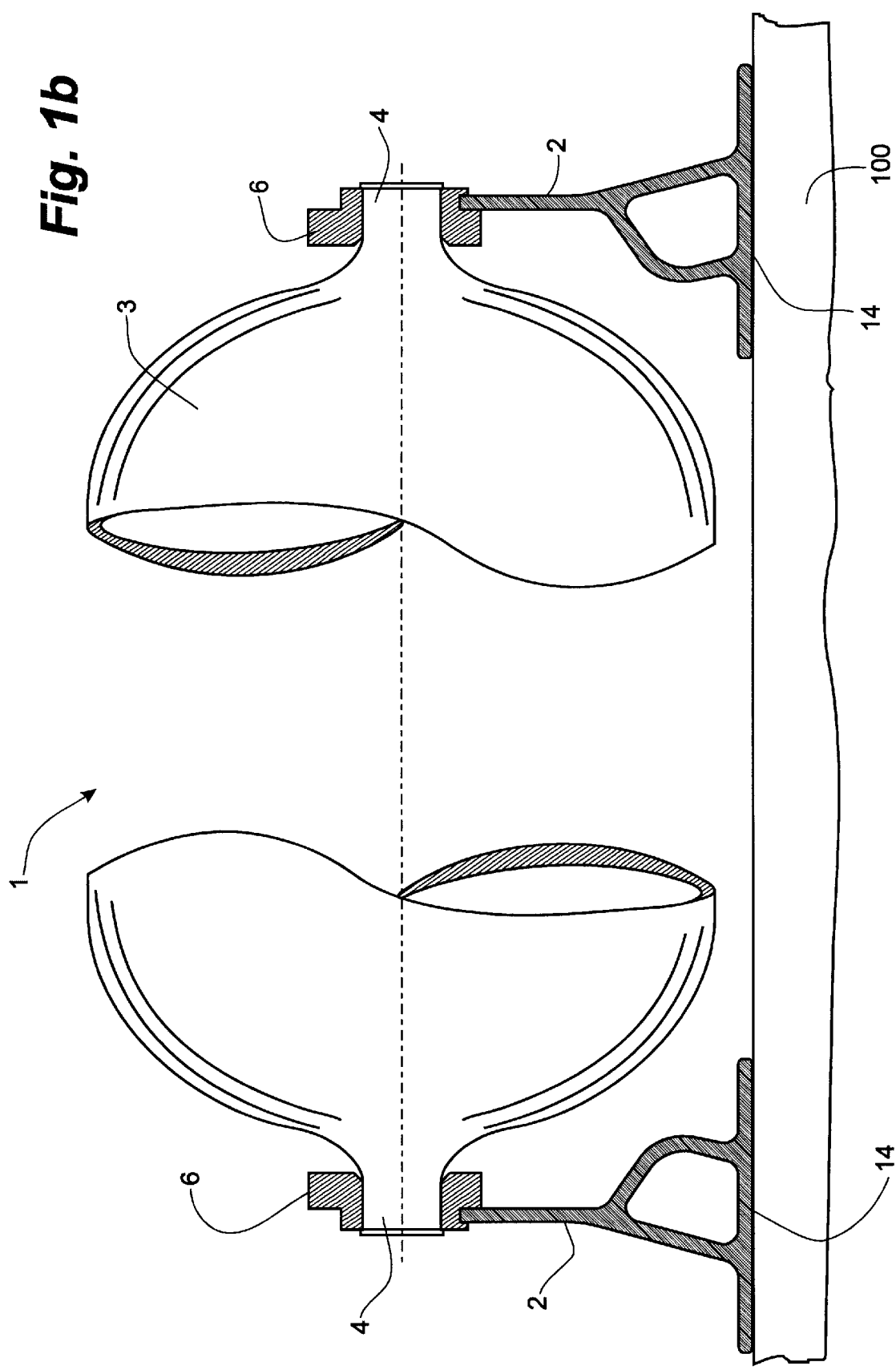
FIG. 1b is a side discontinuous view of a pressure vessel being supported at each neck end by an attachment to a bracket according to an embodiment of the present invention.

As shown in FIG. 1b, each pressure vessel 3 has first and second neck ends 4 at opposing ends of the pressure vessel 3. The neck ends 4 are secured to the brackets 2 at mounting attachments 6 affixed to the brackets 2 at spaced intervals. Assembled together with the mounting attachments 6, the pressure vessels 3 and brackets 2 have sufficient structural rigidity to form a mounting system 1.

Figure 2B:
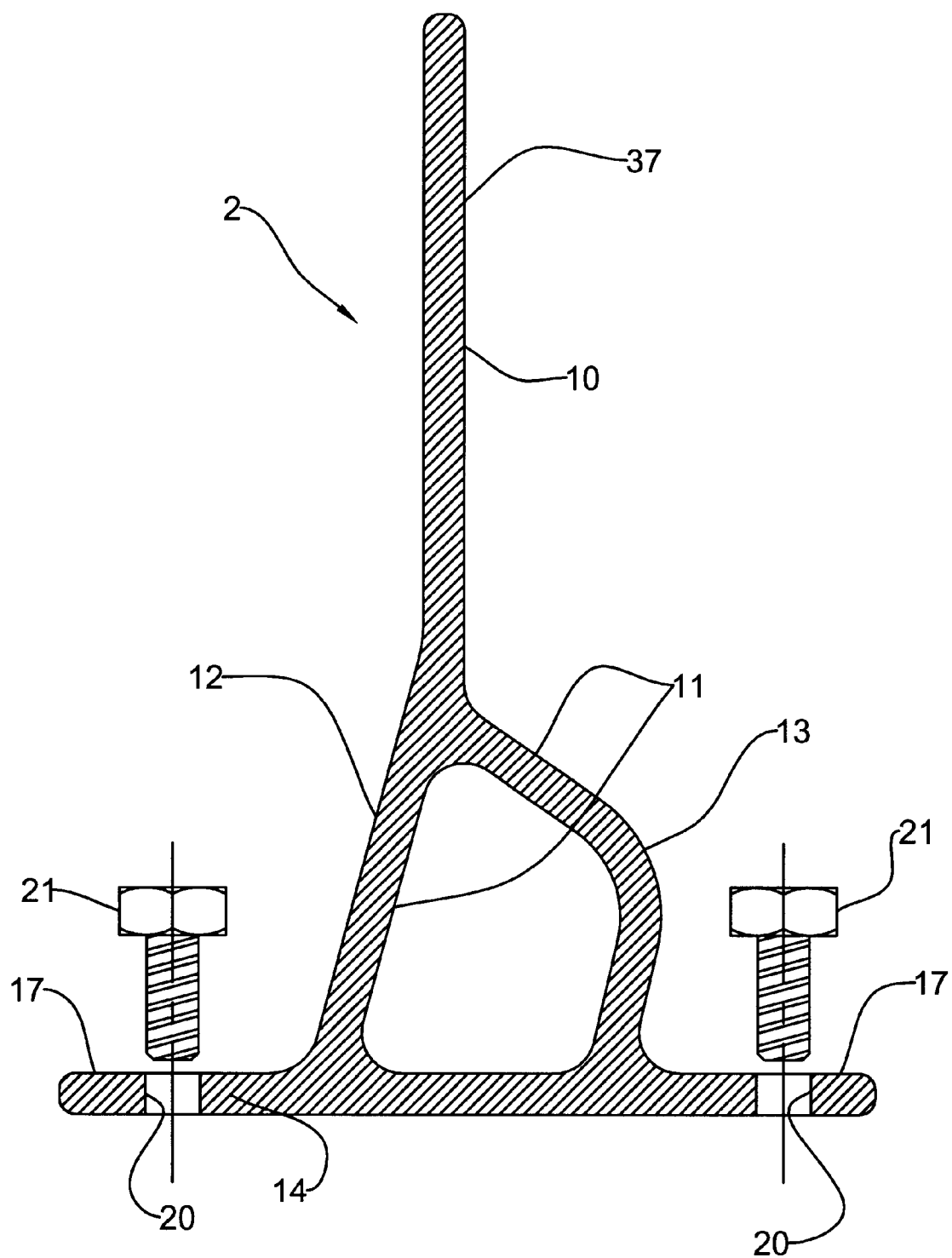
FIG. 2b is an end view of one embodiment of a fiber-reinforced composite bracket of the present invention showing a profile of the bracket and illustrating mechanical fastening to a structure through flanges extending laterally from the base of the bracket.

As shown in FIG. 2b and in a preferred embodiment of the invention, each bracket 2 is a unitary member having a base 14 and a web 10. The bracket 2 has a decreasing stiffness from the base 14 to the tip of the web 10 to which the neck ends 4 are mounted. The bracket 2 is sufficiently stiff to resist inertial acceleration loads imposed by a pressure vessel 3 yet is sufficiently flexible to absorb differential expansion of the pressure vessels 3.

It is understood that the brackets 2 may be mounted to the structure 100 in substantially any orientation. However, in the preferred embodiment and in a usual case, the pressure vessels 3 are mounted horizontally and above the structure 100 to which they are mounted. Accordingly, herein for convenience only and to assist in the visualization of the bracket, the base 14 is referred to as being at the bottom of the system and the web 10 is extending upwardly from the base 14. Clearly, if the brackets 2 are mounted on the underside of the structure 100 then the web 10 extends downwardly from the base 14.

In one preferred form of the bracket 2, adapted to mount atop a structure 100 such as the roof of a vehicle, the unitary member or bracket 2 comprises a polygonal tubular portion 11 extending upwardly from the base 14 and wherein the web 10 extends upwardly from the tubular portion 11. The resulting overall cross-sectional profile appears like the Greek letter lambda "λ" or more simply a lower-case letter "h" extending upwardly from a flat base. The "h" profile of the tubular portion forms a bench from which the web 10 extends. Accordingly, the tubular portion 11 comprises outside and inside leg portions 12,13 and the base 14 defining a hollow core 25 within and extending along the brackets longitudinal axis Ab. The web portion 10 is conveniently manufactured to extend as an extension to one of the legs 12 of the "h". Conveniently, due to the arrangement of the web 10, the tubular portion 11 and inside leg 13 protrude inwardly towards the pressure vessel 3 but do not interfere due to the receding profile of the pressure vessel's hemispherical ends.

Figure 2C:
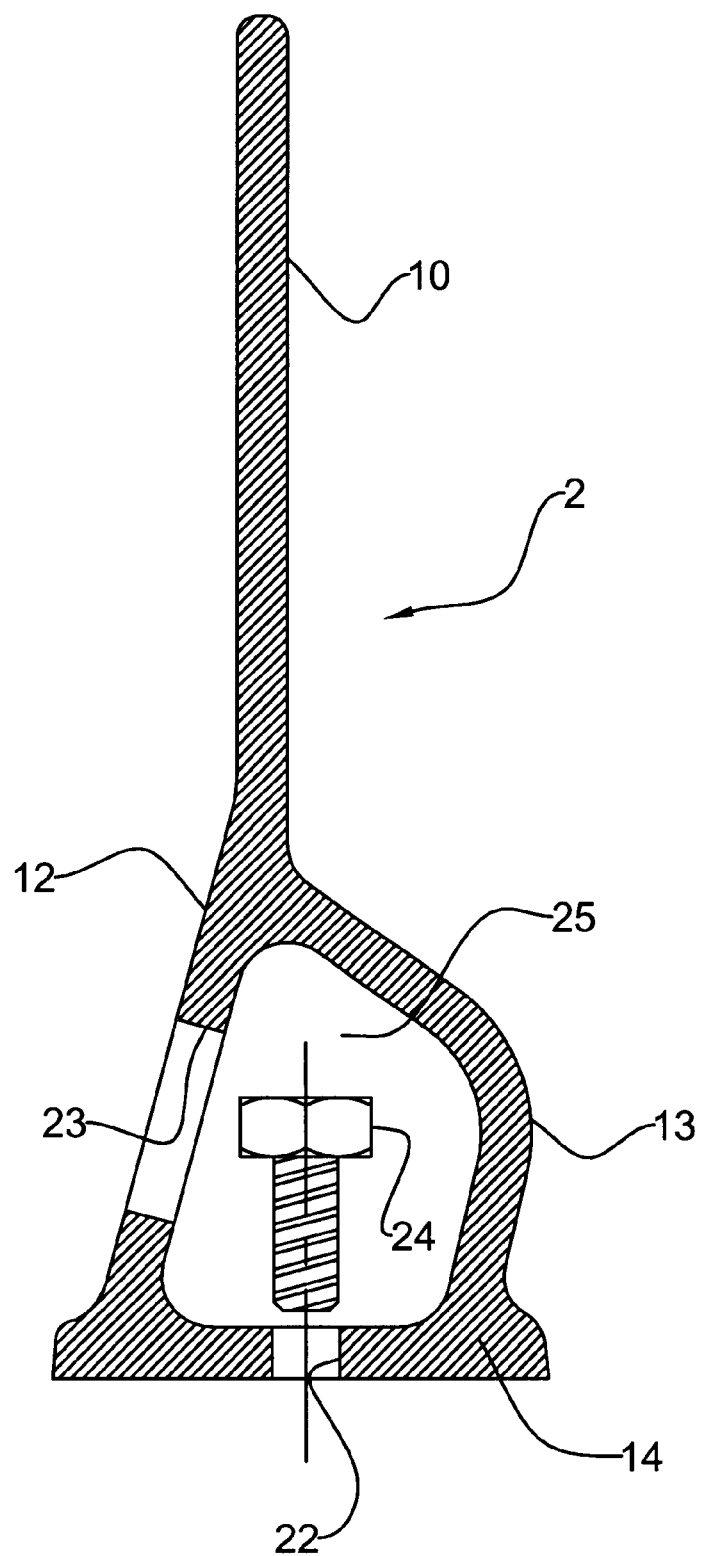
FIG. 2c is an end view of the bracket according to FIG. 2a, illustration an alternate embodiment wherein the bracket is mechanically fastened along the base of the hollow core of the bracket.

As shown in FIGS. 1a,2c, periodic openings 23 are formed at intervals along the tubular portion 11 to reduce the overall weight of the bracket 2 and to provide convenient access to the hollow core 25. As shown, the openings 23 are formed along the outside legs 12. Further, the hollow core 25 and the openings 23 therealong can be used as a corridor for housing piping 26 and electrical lines 27 (FIGS. 10, 11) and to facilitate their attachments to the individual pressure vessels 3. Optionally, the openings 23 can be used for access to enable mechanical fastening of the bracket 2 to the structure 100.

In FIG. 1b and 3a–3c, semicircular indentations or notches 15 are formed at regular intervals along the length of a top edge 19 of the upwardly extending web portion 10 of each bracket 2. Each notch 15 supports one of the one or more mounting attachments 6. As shown in FIG. 3b, a plurality of mounting flanges 17 extend laterally from the bracket's base 14. The mounting flanges 17 further enable securing of the bracket's base 14 to the structure 100. For enabling better maintenance and installation access, the flanges 17 are preferably spaced at regular intervals between the pressure vessels 3 and thus are arranged to be approximately centered between the notches 15.

As shown in FIG. 2b, each mounting flange 17 has means for attaching the brackets to the structure. In one embodiment, the flanges are fitted with one and typically two bolt holes 20 formed therethrough for fastening the brackets 2 to a structure 100 such as a vehicle roof, using fasteners such as bolts 21. Alternatively, as shown in FIG. 2c, the bracket 2 may be fastened to the structure through holes 22 formed in the base of the hollow core 25 and at intervals corresponding to the access openings 23 formed along the length of the outside leg 13.

Figure 4A:
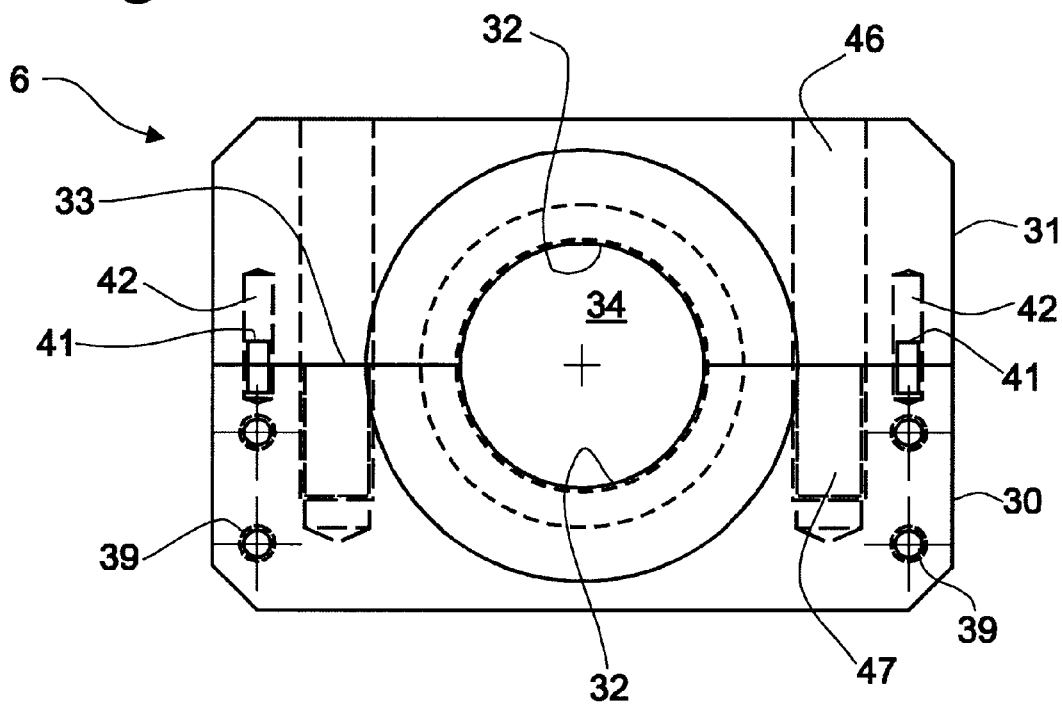
FIGS. 4a and 4b are front and side cross-sectional views respectively of an assembled mounting attachment.
Figure 4B:
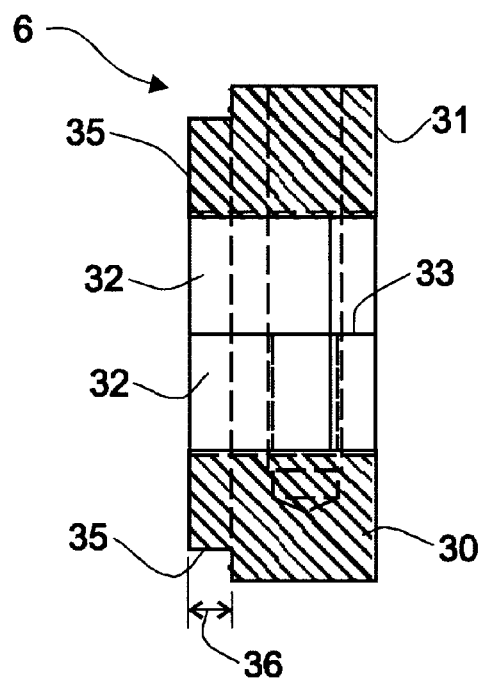

More particularly and in one embodiment, as shown in FIGS. 4a,4b,5a and 5b, the mounting attachments 6 form a connecting interface between the pressure vessel 3 and the web 10. The mounting attachment 6 which connects to the pressure vessel 3 also connects to the web 10. As shown, one form of mounting attachment 6 is provided in two separate pieces, a bottom collar 30 and an upper clamp 31. Both the collar 30 and clamp 31 have co-operating semicircular openings 32 formed about the center of a parting edge 33 so that when assembled, the mounting attachment 6 has a circular opening 34 for surrounding and engaging the neck end 4 of a pressure vessel 3. Both the collar 30 and the clamp 31 have a laterally projecting semicircular edge or profile 35 about the semicircular openings 32 as shown in FIG. 4b. The profile 35 is complementary with the notch 15; the profile having a depth 36 substantially the depth of the thickness of the width of the web 10 and having a radius matching that of the semicircular notch 15.

Figure 5B:
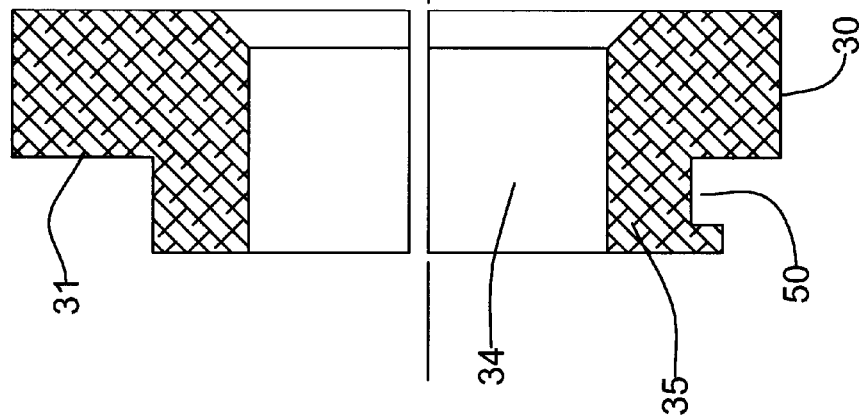
FIGS. 5a and 5b are front and side cross-sectional views respectively of an alternate neck-mounting attachment.
Figure 5A:
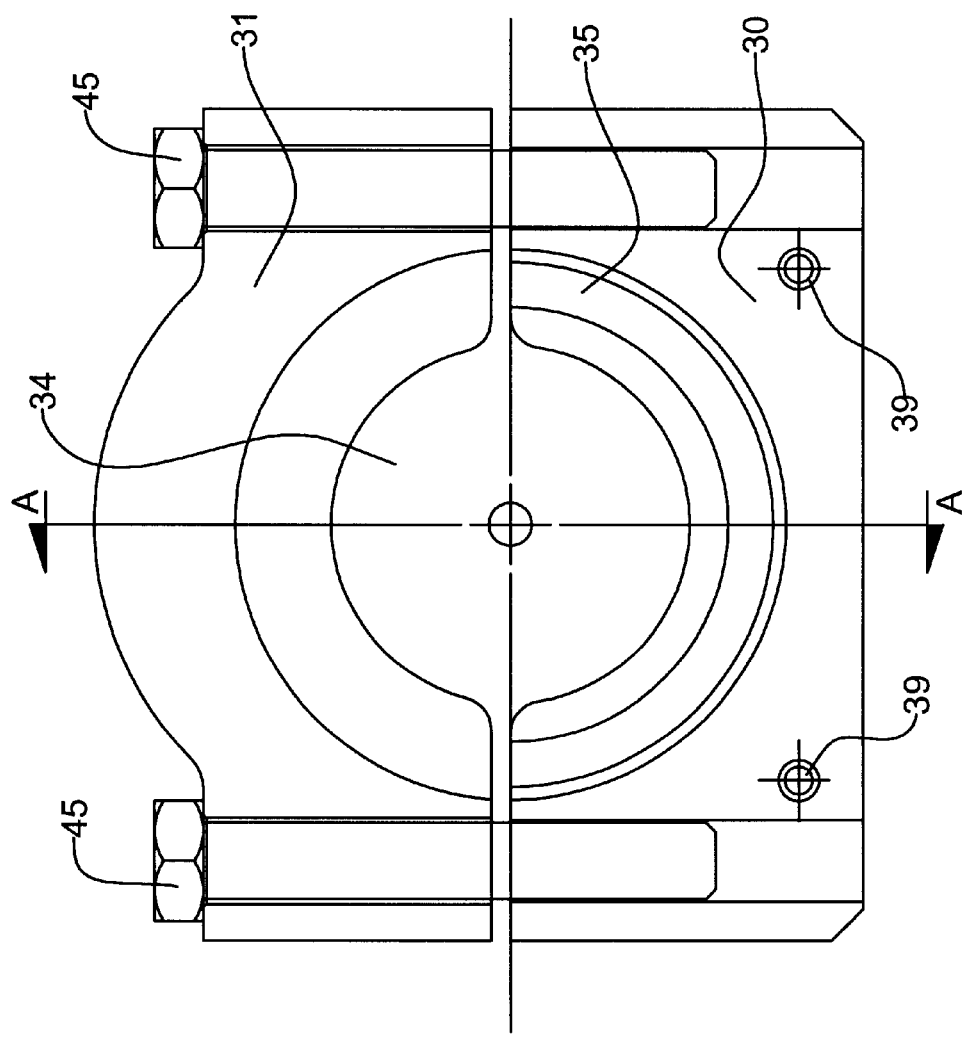
Figure 6:
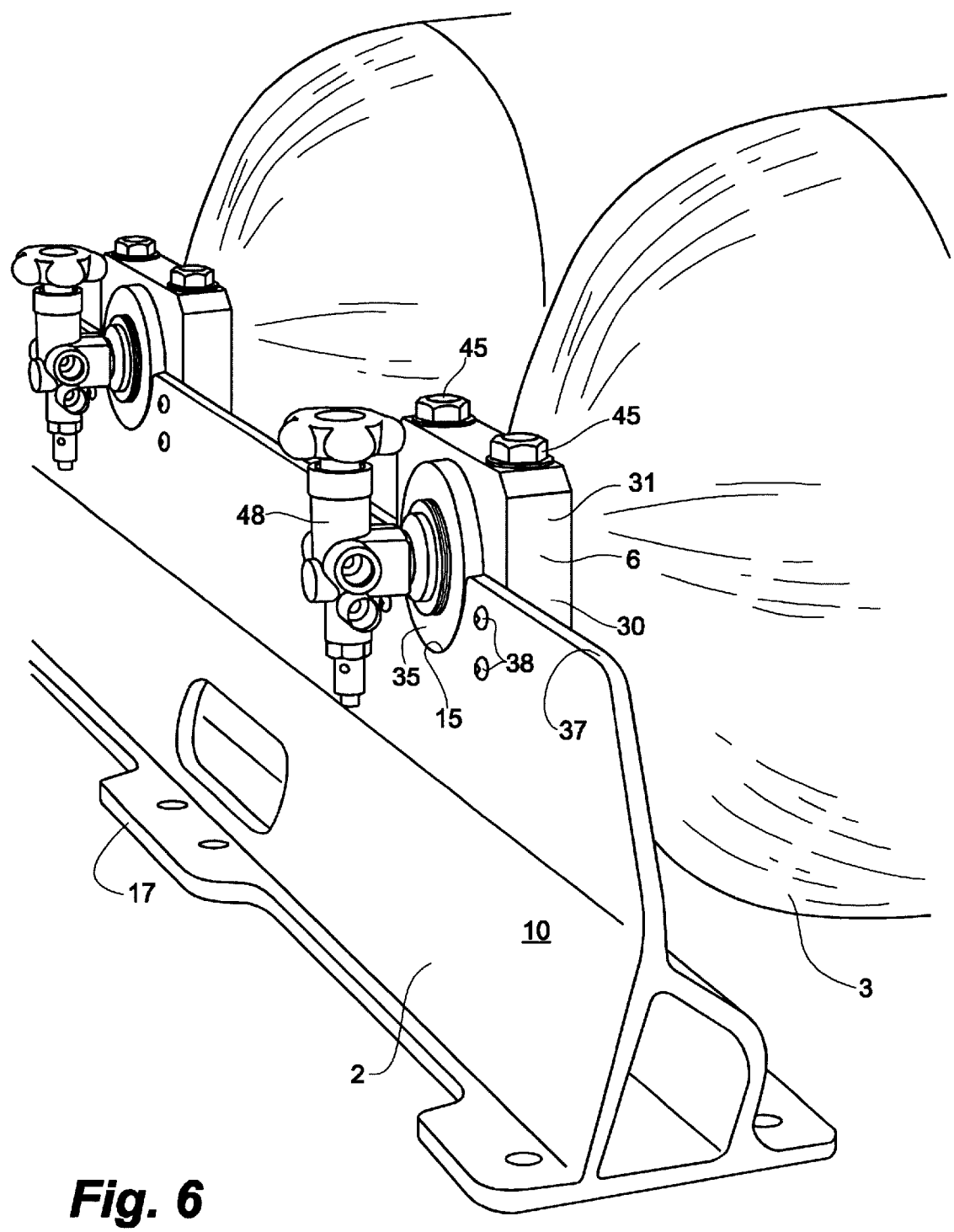
FIG. 6 is a close-up, perspective view of one bracket of the mounting system according to FIG. 1.

With reference to FIGS. 5a, 5b and 6, the collar 30 is alternatively formed with an annular indentation 50 formed about the laterally projecting semicircular profile 35. The annular indentation 50 straddles the web 10 and engages the edge of the semicircular notch 15 to aid in fastening the mounting attachment 6 to the bracket 2 and to further support the mounting attachments 6 including minimizing "peeling" away from the web's inside surface 37 under load. The mounting attachment 6 is fastened to the bracket 2 using at least one mechanical fastener 38 through holes 39, preferably one on each side of the projecting profile 35.

Figure 7:
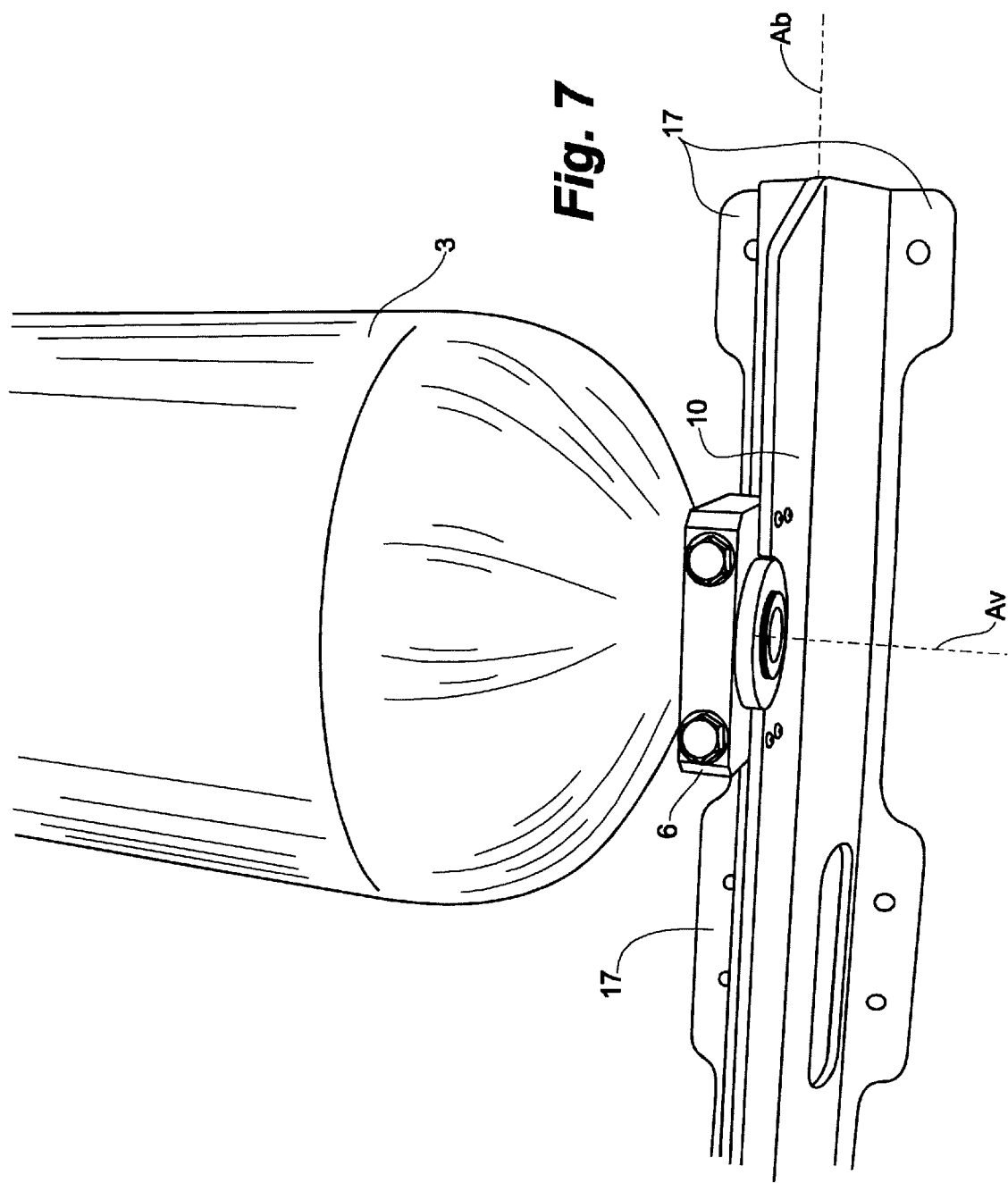
FIG. 7 is a close-up, top view of the mounting system according to FIG. 6.

Best seen in FIGS. 6 and 7, the profile 35 of the mounting attachment 6 is located and supported in the notch 15. The collar 30 is adhesively bonded to an inside surface 37 of the web 10. Optionally, as shown in FIGS. 4a,6 and 7, the collar 30 can be further affixed to the bracket 2 by mechanical fasteners 38 extending through holes 39 in the collar and holes 40 (FIGS. 3a, 3c) in the bracket 2. After the neck end 4 of the pressure vessel 3 is positioned in the collar 30, the clamp 31 is aligned with the collar 30 and the clamp 31 is bolted to the collar 30 by bolts 45 extending through bolt holes 46 in the clamp and into a cooperating and threaded bolt hole 47 in the collar 30. Assembly can be further aided by aligning dowels 41 with cooperating openings 42 formed along the parting edge 43.

The mounting attachment 6 grips the pressure vessel neck ends 4 to prevent relative movement therebetween; accordingly, movement of the pressure vessel 3 is directed into the brackets 2. Pressure relief devices and associated fill and delivery valving 48 extend from the neck ends 4 of the pressure vessels 3 permitting ease of access.

The mounting attachments 6 are preferably manufactured of aluminum, such as 6061-T651 plate using conventional solid block machining, or casting and machining or extrusion and machining techniques. Typical material properties would be 260 MPa tensile, 240 MPa yield and elongation of 12%. SAE Grade 8 bolts fasten the clamp 31 and collar 32 together.

The brackets 2 are preferably manufactured by a pultrusion process utilizing fiber-reinforced thermal set resins or thermoplastics. Typical materials of construction include multiple layers of reinforcing glass, such as product code E-QXMP-4008-10 from JICRI, and E-Glass filler such as 4400 Tex and PU resin such as Version G, from Resin Systems Inc. The web and base are typically formed of 5 layers of reinforcement glass. The leg portions 12, 13 can be formed with additional layers. E-glass filler is provided in an amount needed to fill the pultrusion die.

Features such as the notches 15 and openings 23 in the outside leg 12 are machined following pultrusion using conventional machining or using water jet or abrasive water jet cutting techniques.

Figure 8:
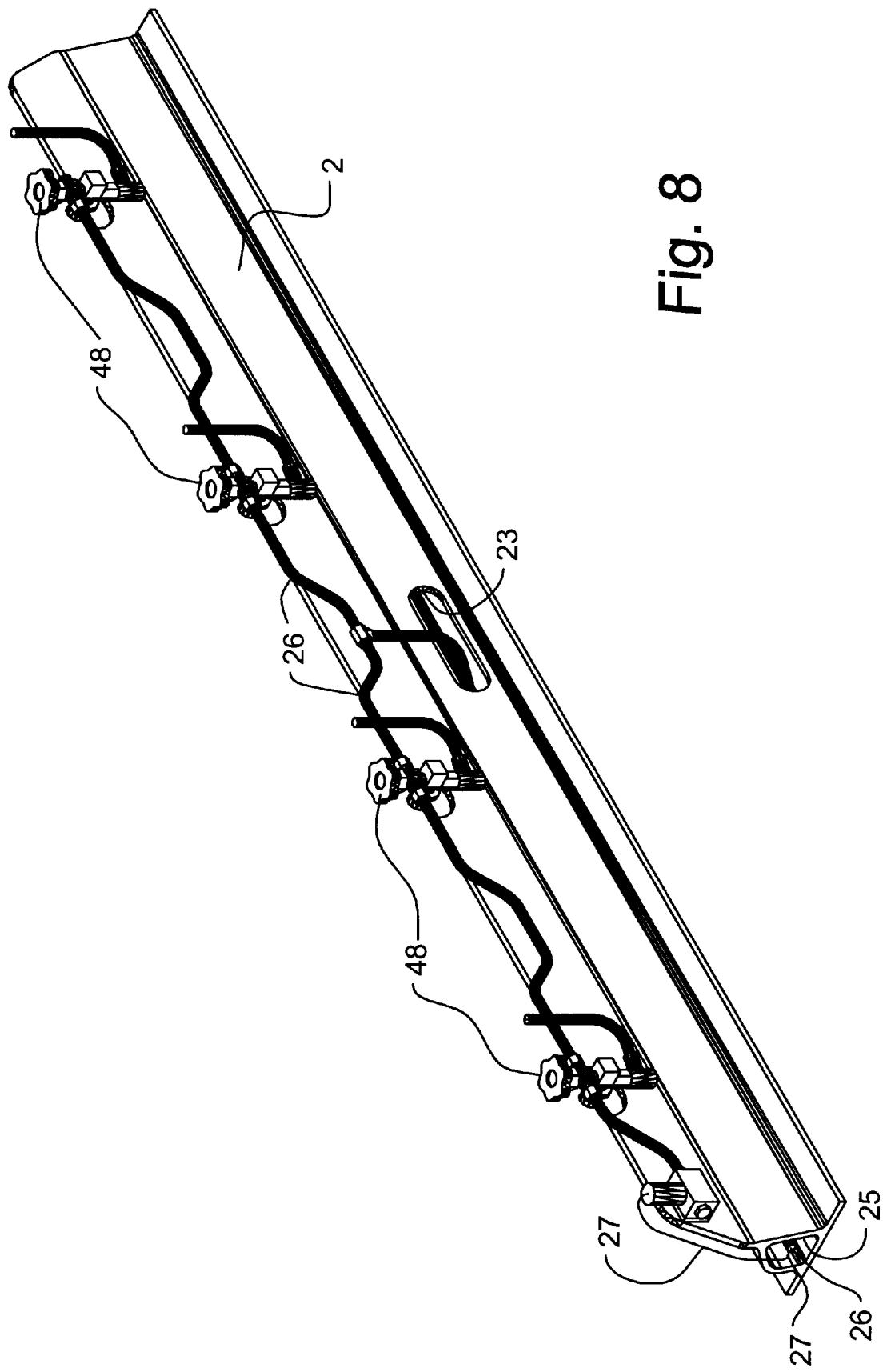
FIG. 8 is a view of a bracket in which its hollow core and openings therein provide a protective corridor for routing and connecting utilities between the pressure vessels and connections outside the system.
Figure 9:
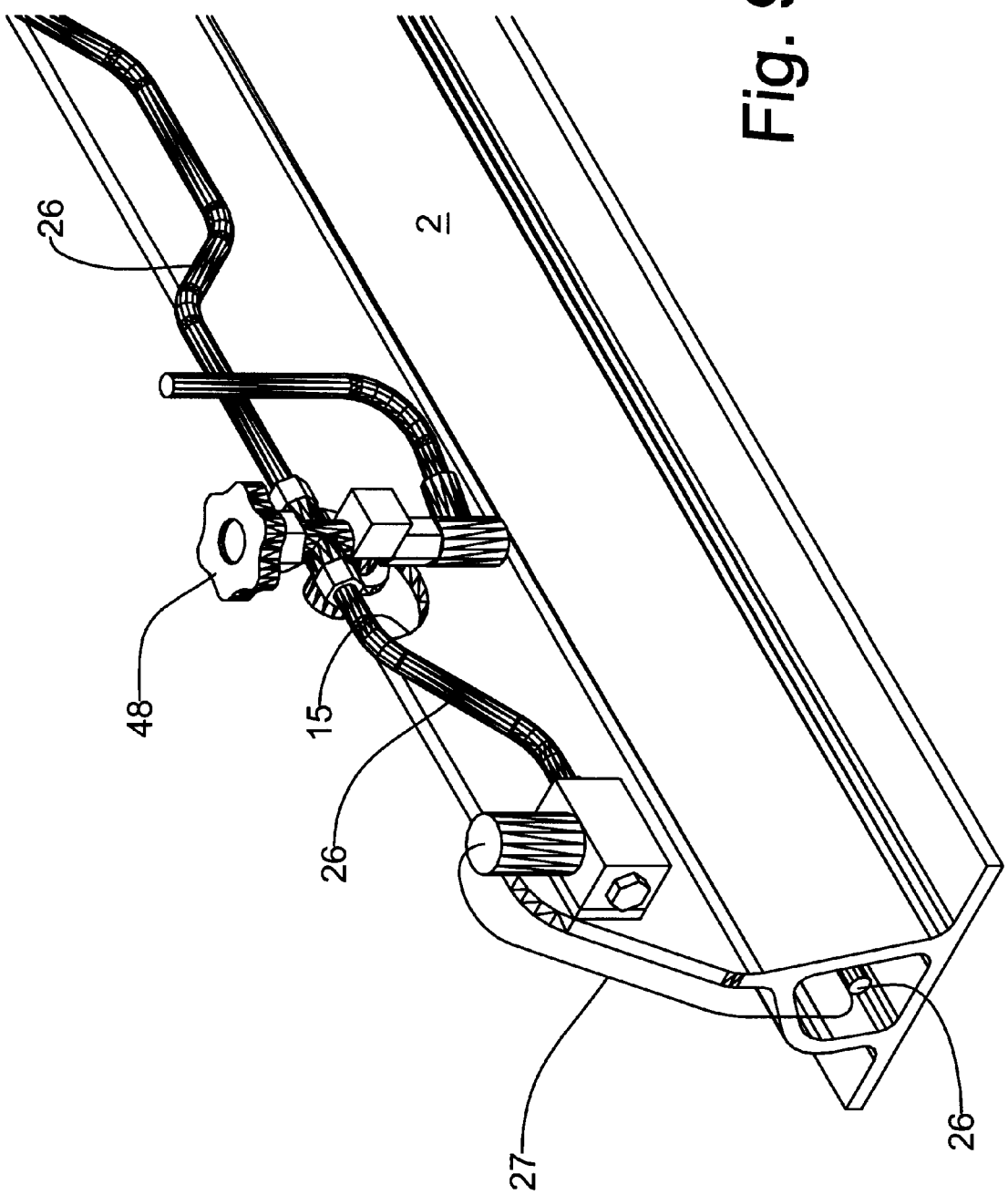
FIG. 9 is a close up view of one end of the bracket of FIG. 8.

Further, as shown in FIGS. 8 and 9, the openings 23 provide access to the protected corridor of the hollow core 25 of the bracket 2 through which piping 26 and electrical 27 may be routed to the individual pressure vessels 3.

EXAMPLE

Figure 10:
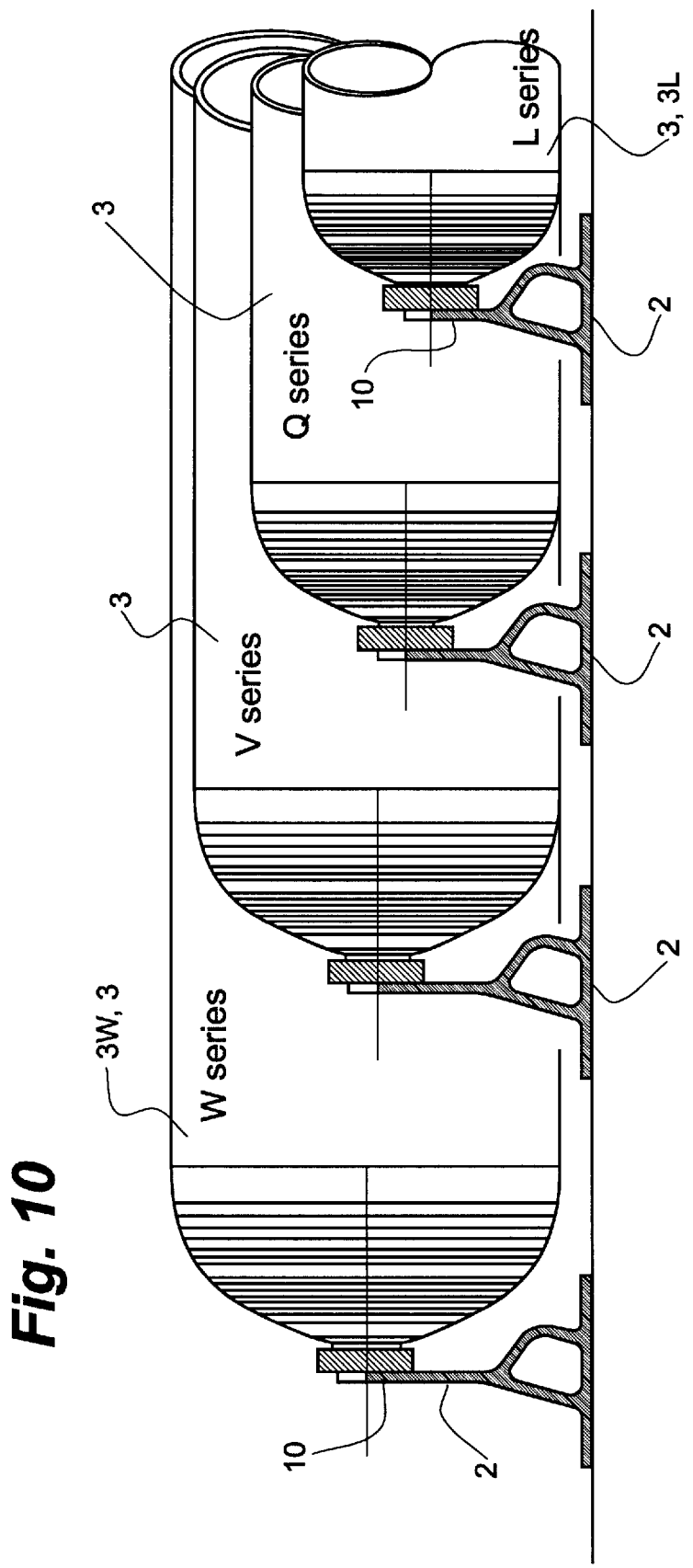
FIG. 10 is a comparative side view of one end of each of a series of progressively size pressure vessels, all adapted to the same bracket which have webs of varying and corresponding height.

With reference to FIG. 10, the design of a bracket 2 was optimized for producing a standard mounting bracket profile that could accommodate one or more parallel pressure vessels 3, and could be trimmed to length and thereby be fitted to individual applications, a specified number of pressure vessels, or to suit a particular mounting system 1 or structure 100. As well, the profile of the bracket 2 had to accommodate the various pressure vessel sizes and lengths offered in commercial service. The resulting profile would require a web 10 having a manufactured length that would accommodate the largest diameter pressure vessel 3 W, which could also be trimmed to accommodate the smallest pressure vessel 3 L. Further, the bracket 2 was required to have adequate flexibility to accommodate a 0.1% linear expansion from a pressurized vessel. A 3.5 mm expansion for example could be expected in the case of the longest of the Dynetek W320 series which are a nominal 404 mm in diameter by 3048 mm in length. Two-dimensional finite element models using PLANE2D elements were developed for several bracket profiles. From the onset, the mounting bracket 2 was intended to be made from a composite material having several advantages over that of structural steel and aluminum, for example: good strength-to-weight ratio, acceptable material costs and required flexibility. For example, the material properties shown in Table 1 are for an all glass stitch cloth pultrusion with 5 layers of E-QXMP-4008-10 glass cloth. The in-plane and flexural moduli listed in Table 1 were used in specifying the element property sets for the finite element analysis (FEA).

TABLE 1

| | In-Plane Stiffness | | In-Plane Tensile Strength | | Bending Stiffness Stiffness | | Bending Strength | |
|---|---|---|---|---|---|---|---|---|
| | Modulus GPa | Stiffness, EA kN* | Ultimate Stress MPa | Max. Load kN* | Modulus GPa | EI N.mm 2/ mm* | Ultimate MPa | Max. N-mm* |
| Longitudinal | 11.7 | 3,068 | 188 | 46.5 | 10.6 | 827,953 | 267 | 107,901 |
| Transverse | 14.5 | 3,589 | 206 | 51.1 | 12.5 | 968,506 | 297 | 120,103 |

*indicates properties for 25.4 mm (1") wide strip of laminate

The strength and stiffness properties of a 10 mm thick laminate were: p=1,634 kg/m3, a Vf=33%, and Mf=51 %. The finite elements were given orthotropic properties corresponding to those listed in Table 1.

An S-shaped profile (not shown) was initially considered and anticipated to satisfy all the design requirements, but upon further analysis it was found that, while structurally sound, it did not meet the specified 12.5 mm deflection limit under 20 g loading. Several variations of the S-shaped profile were analyzed in an attempt to increase its stiffness. It became clear from the FEA results that increasing the bracket thickness alone would not be a desirable approach to gain the desired values. Further, from a production and weight point of view, it was also desired to keep the bracket thickness at 10 mm.

Figure 12A:
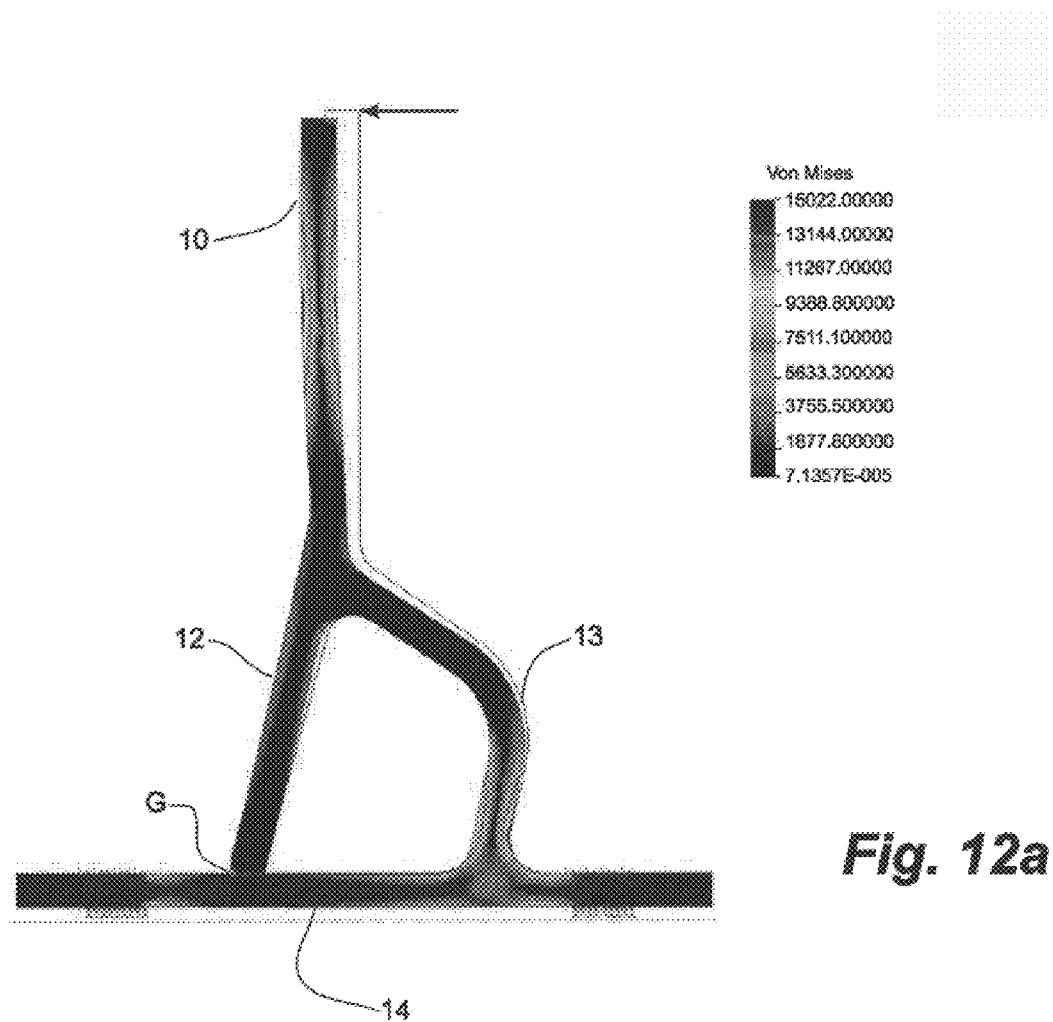
FIG. 12a is a stress plot of the profile of FIG. 11a loaded from the inside of the bracket, the gap being forced closed.
Figure 12B:
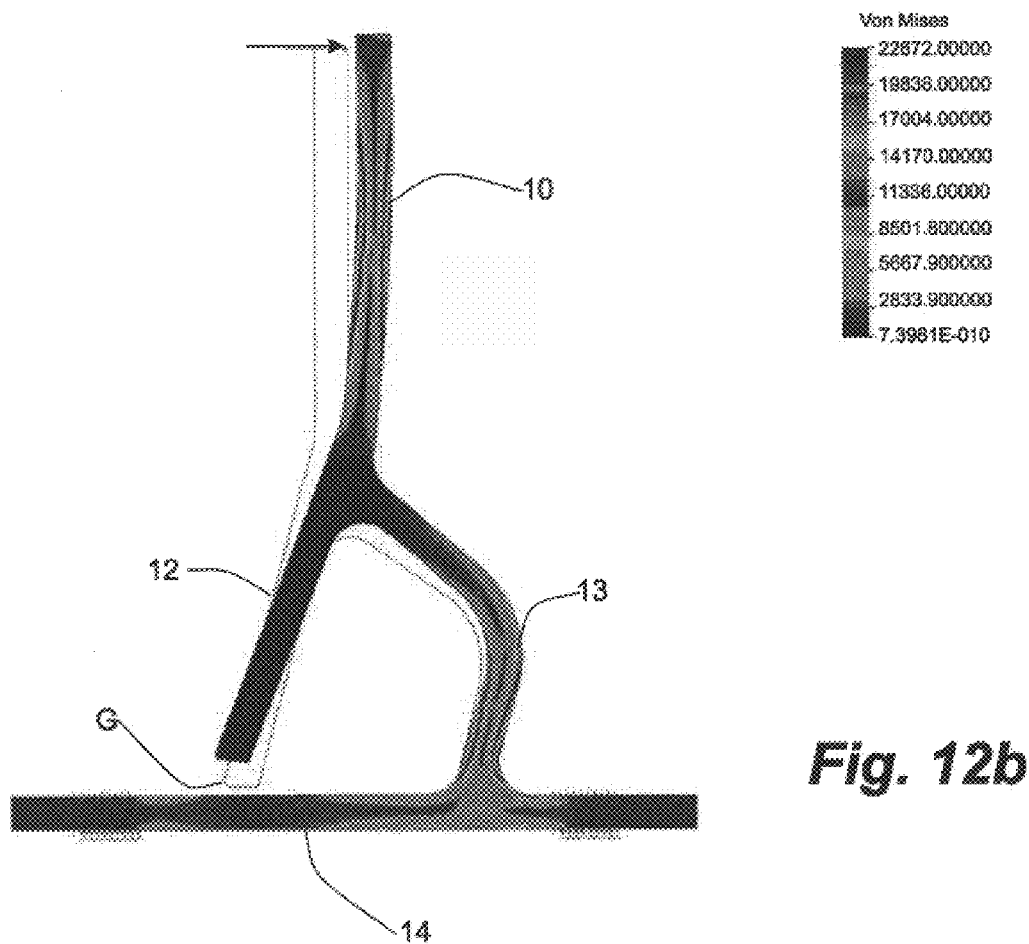
FIG. 12b is a stress plot of the profile of FIG. 11a loaded from the outside of the bracket, the gap opening.

Alternative profiles were then developed, as shown in FIGS. 11a,11b, that combined the flexibility needed to accommodate the linear expansion of the pressure vessels 3 as well as being able to resist the 20 g inertial load. The resulting bracket 2 that came about which satisfied the design conditions was the aforementioned λ-shaped or "h"-shaped profile. Initially, it was thought that a 3 mm gap G in the outside leg 12 (FIG. 11a) would be advantageous because of its spring effect. The gap 12 essentially provided the bracket 2 with two stiffness values; one while the gap was open (FIG. 12b) wherein the bracket 2 would behave much like the S-shaped profile; and secondly, the bracket's stiffness would then dramatically increase when the gap G closed (FIG. 12a) limiting its deflection under a 20 g inertial load. Results of the deflection are illustrated in FIGS. 12a and 12b. The analysis of a system 1 using such a bracket 2 became complicated after the deflection and natural frequency behavior was considered. In its displaced form, the gap G continues to separate in the bracket 2 at one end of the pressure vessel and progressively closes in the bracket 2 at the opposite end of the pressure vessel 3. Fabrication procedures to form an accurate gap spacing would also increase production cost. While suitable in most respects, practical considerations led to removal of the gap G from the bracket 2 for further consideration.

Figure 13A:
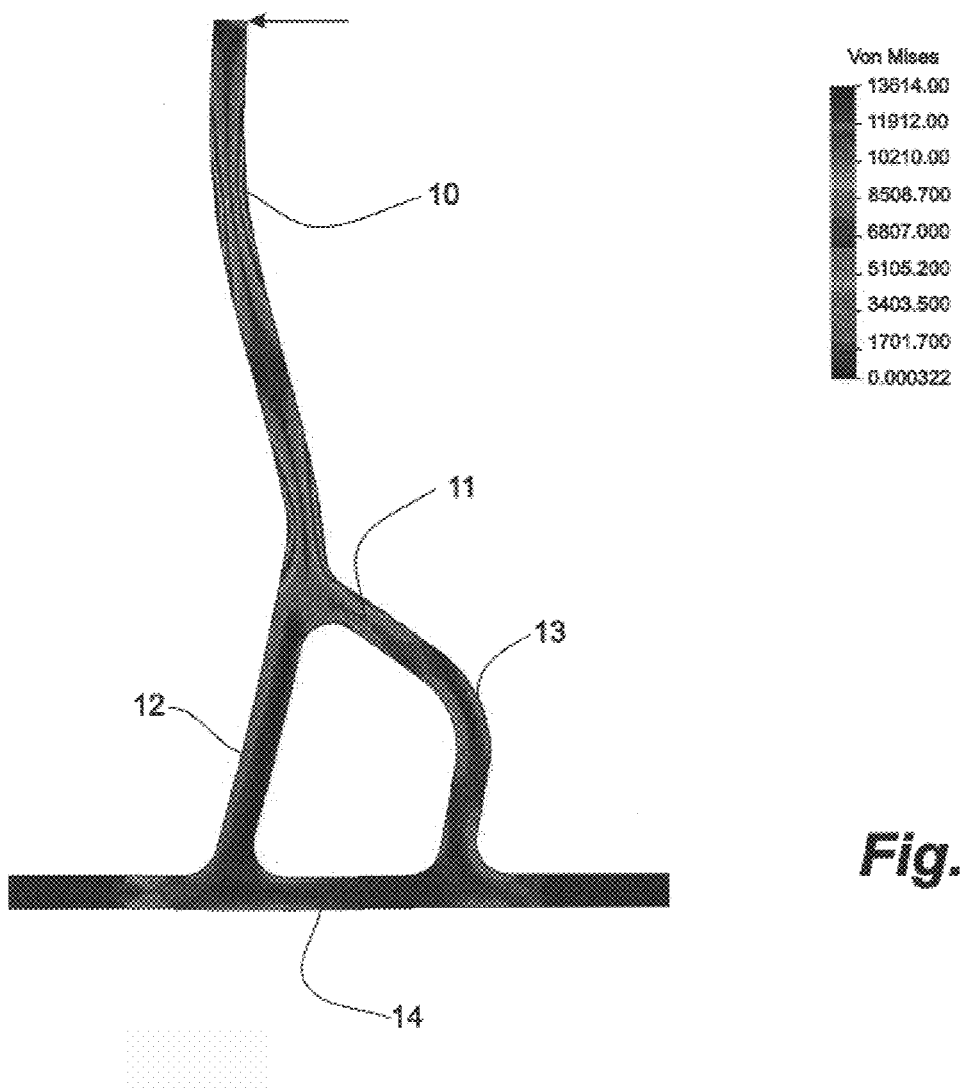
FIG. 13a is a stress plot of the profile of FIG. 11b loaded from the inside of the bracket.
Figure 13B:
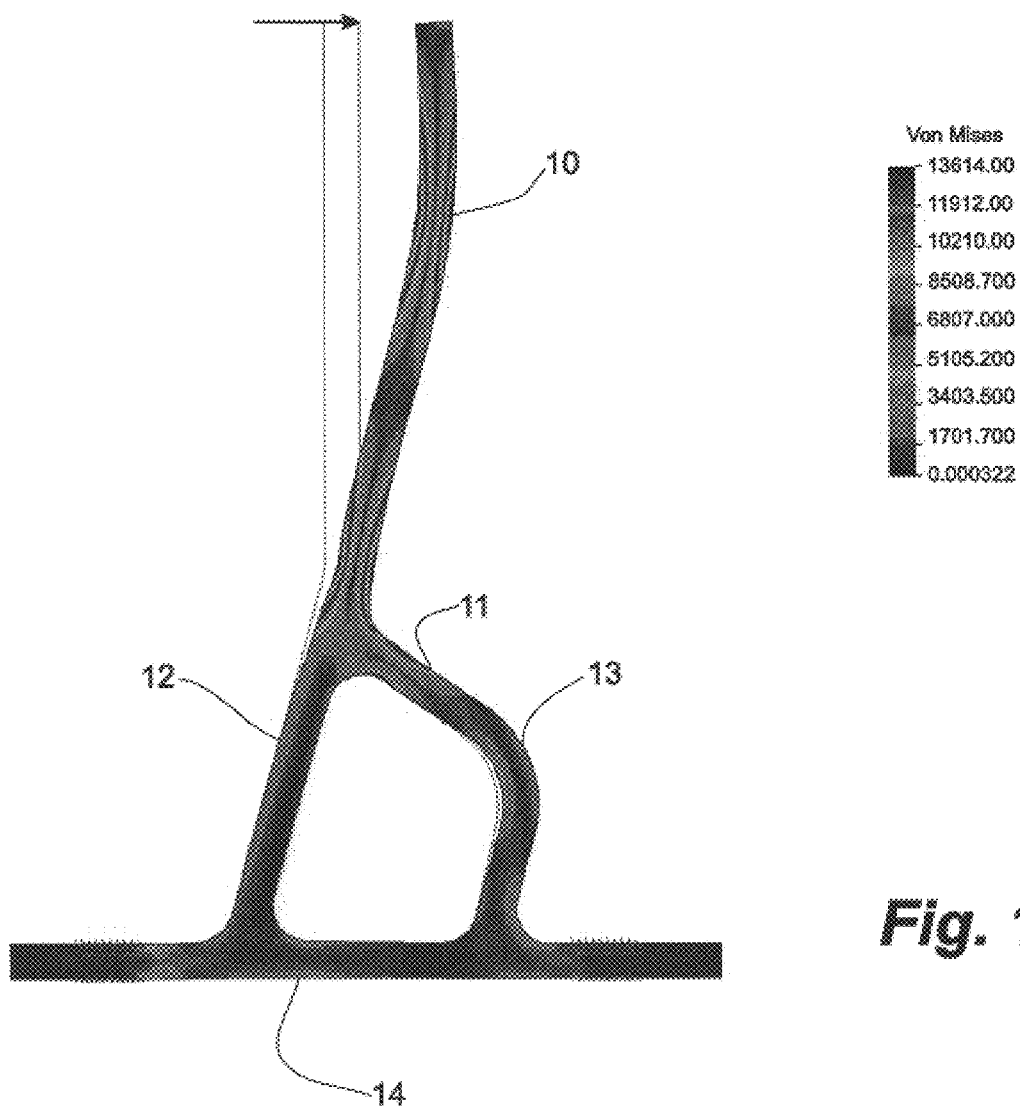
FIG. 13b is a stress plot of the profile of FIG. 11b loaded from the outside of the bracket.

FIG. 11b and FIGS. 13a and 13b illustrate a preferred profile for the bracket 2. Referring also to FIG. 10, the web 10 was sized so that the profile could be used for the smallest diameter series of pressure vessels without protruding below the base 14 and thus avoiding interference with the structure 100, or requiring a countersinking of the structure 100.

As shown in FIGS. 13a,13b, having an exaggerated displayed displacement, FEA of the λ-profile under 20 g loading also showed good results. The profile's high stiffness value was also beneficial from a dynamic point because of the associated increase in its natural frequency. After conducting the above profile evaluations, it was concluded that the λ-profile produced superior results with respect to its stiffness, deflection and stress distribution. The final dimensions of the example bracket 2 were 10 mm thickness throughout and having a 270 mm overall height of which comprises a 150 mm web 10 above the tubular portion 11. The base 14, including flanges 17, had a width of 200 mm. The inside leg 13 was angled slightly to the pressure vessels at 77° to the base 14. The outside leg 12 was similarly angled slightly to the pressure vessels 3 at 105°. The web 10 extended perpendicularly to the base 14. The upper surface of the tubular portion 11 angled about 125° downwardly from the web 10.

With reference to FIGS. 14–18, stress and deflections were predicted using three dimensional linear static FEA using the preferred bracket profile, as described. Two design prototypes were considered, namely: a longitudinal arrangement and a transverse arrangement.

Figure 14:
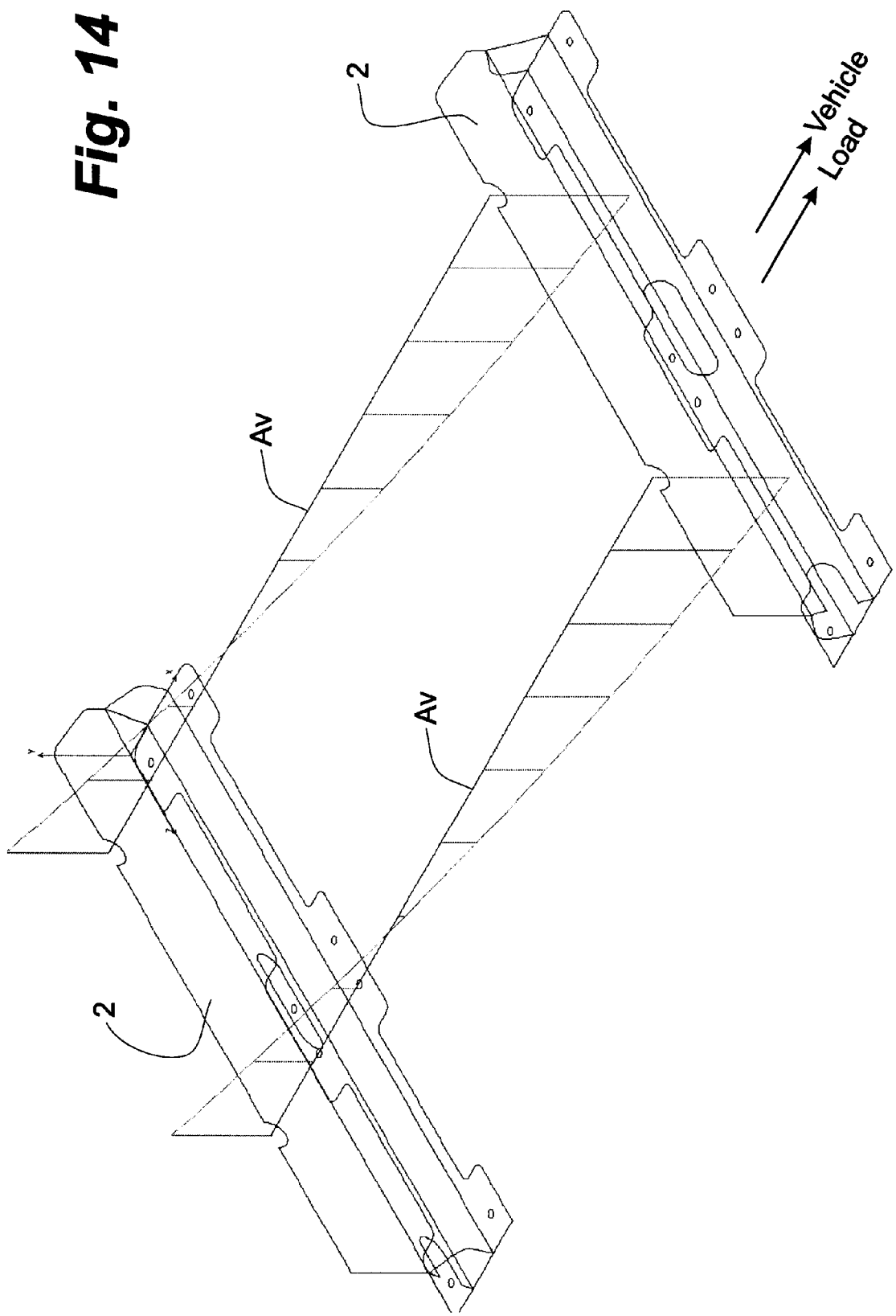
FIG. 14 is a perspective view of bending moment diagrams for a longitudinal arrangement of pressure vessels and which is superimposed over a pair of brackets having two pressure vessels mounted therein. The brackets are oriented transverse to the inertial loading imposed by the pressure vessels. The pressure vessels are not shown so as to better emphasize the bending moment diagrams.
Figure 15:
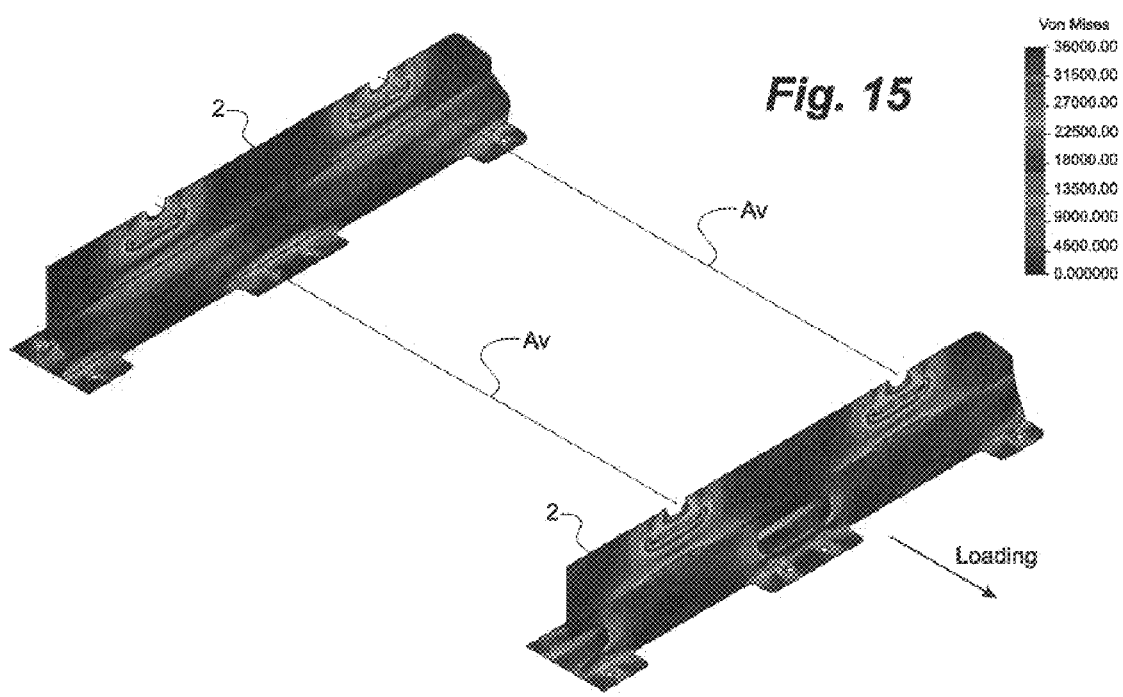
FIG. 15 is a Von Mises stress distribution for the system of FIG. 14 under 20 g loading.
Figure 16:
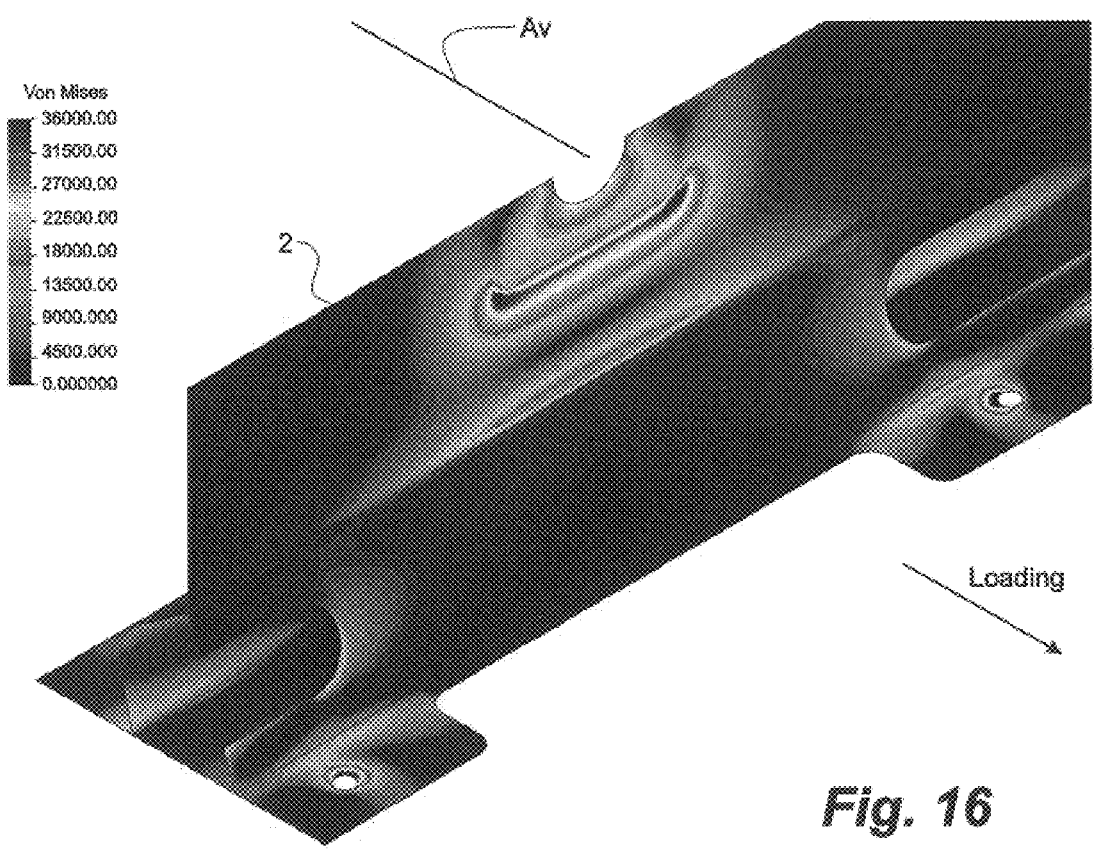
FIG. 16 is a close up of the stress distribution in the front corner of the brackets of FIG. 15.

In the longitudinal arrangement shown in FIGS. 14–16, the pressure vessels 3 were aligned with the direction of inertial loading and the brackets 2 were perpendicular thereto. This is analogous to mounting the brackets 2 and pressure vessels 3 on the roof of a vehicle and having their longitudinal axes Av aligned with the direction of vehicle motion—assuming that is also the probable direction of the most intense inertial loading (a collision).

Figure 17:
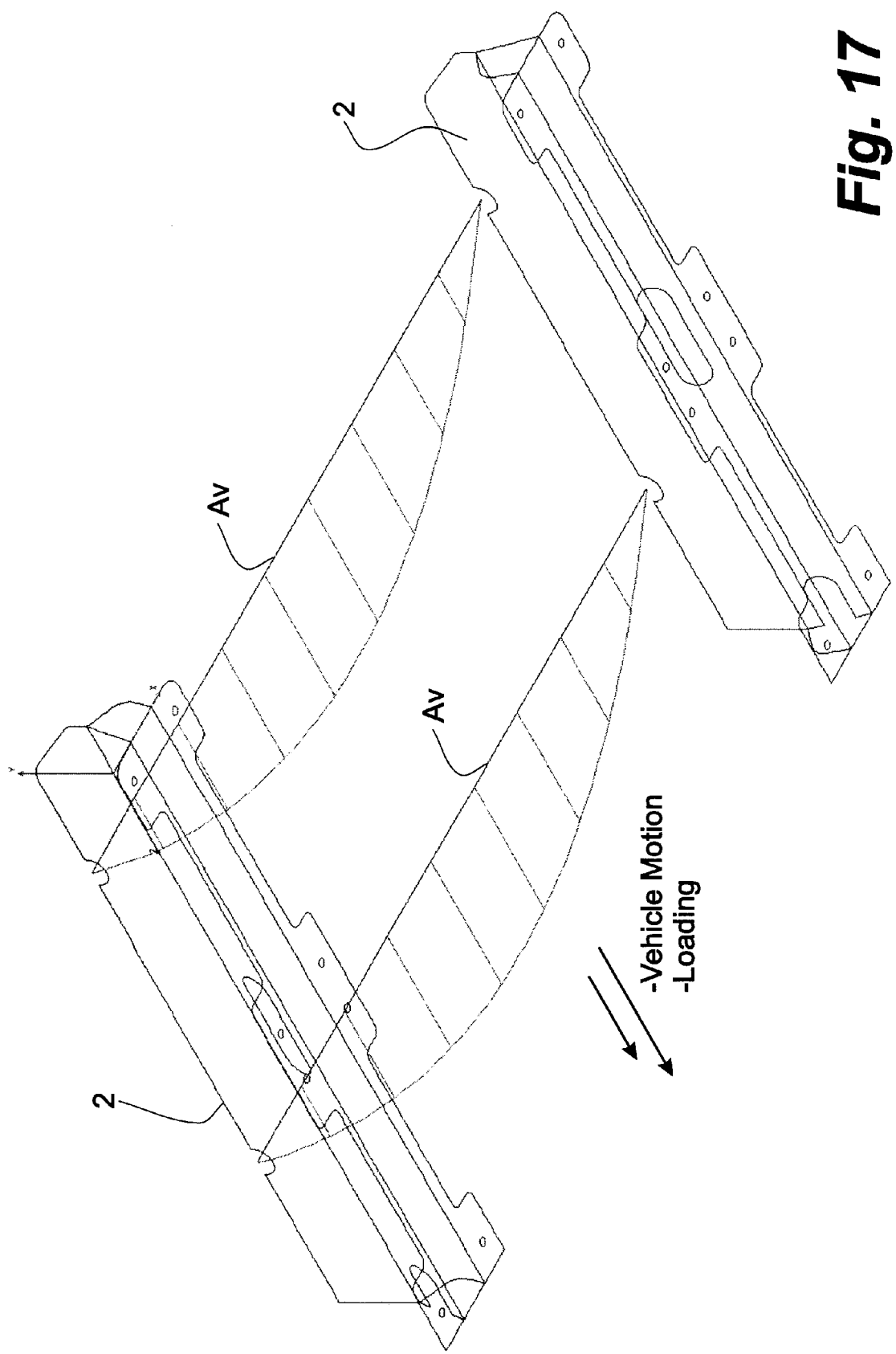
FIG. 17 is a perspective view of pressure vessel bending moment diagrams for a transverse arrangement of pressure vessels and which is superimposed over a pair of brackets having two pressure vessels mounted therein. The brackets are oriented parallel to the inertial loading imposed by the pressure vessels. The pressure vessels are not shown so as to better emphasize the bending moment diagrams.

In the transverse arrangement shown in FIGS. 17 and 18, the pressure vessels 2 are mounted transverse to the direction of inertial loading and the brackets 2 are necessarily aligned or parallel. Currently, this is the most typical orientation used in European commercial vehicles.

In FIG. 14, in the longitudinal arrangement, a row of four pressure vessels were modeled as being mounted to brackets 2 with the pressure vessels axes Av aligned along the length of the vehicle; only two of four pressure vessels being illustrated. A 20 g inertial load was applied to the FEA model. Similarly, a 10 g inertial load was applied transverse. The brackets 2 were assumed to be rigidly mounted by the flanges 17 to the structure 100 and any flexure of the base 14 was ignored. The mounting brackets 2 were modeled using 4-node quadrilateral shell elements with membrane and bending capabilities. Six degrees of freedom, three translations and three rotations, are considered per node. This multi-layer element could be specified with up to 50 layers, each layer associated with different isotropic or orthotropic material properties. However, for the purpose of this analysis, the element was only specified with one layer having the moduli of elasticity and Poisson's ratio as set forth above. Three dimensional 2-node beams elements were used to represent the pressure vessels which were given the properties of a 406 mm outside diameter aluminum tube having a wall thickness of 12 mm. An equivalent mass was specified to the beam elements to represent the full weight of the pressure vessels.

As a result, the deflection of the system was as expected for a rigid frame-like. system undergoing horizontal displacement. With reference to FIG. 14, the predicted end-moments were +855 Nm at one end and −1144 Nm at the opposite end. These should represent the maximum bending moments acting against the brackets under 20 g load.

With reference to FIGS. 15 and 16, peak stresses are shown which result from the flexure of the brackets 2. A maximum Von Mises stress of 300 MPa was predicted at the corners of flanges 17 and 218 MPa along the edges of the flanges 17. Other than the localized peak stress, it can be seen from the stress plots that the nominal flexural stresses do not exceed the theoretical bending strength of the composite as listed in Table 1.

With reference to FIGS. 17 and 18, for a log transverse loading arrangement of pressure vessels, the bending moment is typical with a maximum of 2637 Nm and peak stress was is located at the base of the bracket 2 with the maximum Von Mises stress at 68 MPa. The stresses surrounding the flanges 17 were not significantly higher than the peak stress at the base 14.

A comparison of the moment resistance of the pressure vessel's neck ends with the predicted end moments indicated that the neck ends have adequate strength.

One of the design conditions that were sought was that the deflection of the system under a 20 g inertial load should not deflect more than 12.5 mm. In this example, the mounting system using Dynetek W320 cylinders was considered. The finite element model predicted a maximum horizontal displacement of 8.2 mm and a vertical deflection of 1.6 mm giving a total resolved deflection of 8.4 mm. In the transverse system, the finite element model predicted a 4.8 mm horizontal deflection under 10 g loading. The deflection of the system is very much a function of the bracket stiffness which in turn is a function of the frame height. This can be surmised from deflection equations that the deflection produced by the inertial load of the larger and filled W320 cylinders under 20 g loading would represent the worst case condition.

As discussed, such pressure vessels can undergo a 0.1% longitudinal expansion when pressurized which translates to a maximum deflection of 3.5 mm for the longest pressure vessel regardless of its diameter. This expansion is taken up by the flexure of the brackets as it was so designed. By inspection, it was surmised that the most highly stressed configuration will be for a long, short diameter pressure vessel 3 and bracket 2 configuration. This is because the short web 10 height of this bracket 2 causes a substantial increase in the flexural stiffness of the section.

It can be seen from the above, that the use of the vessels as a part of the system is independent of the exact form of the vessels and that the configuration of the bracket can vary widely as long as it can support the vessels. One form of brackets is demonstrated which is capable a wide range of performance including accepting inertial loads imposed by the vessels under extreme conditions which meet specified regulations. Other implementations or circumstances subject to different regulations may be more or less stringent and the bracket design can vary accordingly. Simply, the brackets are a lightweight and strong yet flexible solution.

The embodiments of the invention for which an exclusive property or privilege is claimed are defined as follows:

1. A system for securing one or more parallel pressure vessels to a structure comprising:
   one or more pressure vessels each having two opposing neck ends and having a longitudinal axis;
   a pair of fiber-reinforced composite mounting brackets, each bracket being a unitary member having a base adapted for mounting to the structure, each bracket being positioned at each neck end of the one or more pressure vessels and having an axis which extends substantially perpendicularly to the longitudinal axis of the pressure vessels; and
   neck-mounting means for mounting each pressure vessel's neck end to each bracket, the one or more pressure vessels extending between the brackets so as to space the brackets apart and add structural rigidity to the system.

2. The system of claim 1 wherein the bracket has a web extending from the base, each pressure vessel's neck end being mounted in the web.

3. The system of claim 2 wherein the bracket has a decreasing stiffness from the base to the neck-mounting means.

4. The system of claim 3 wherein the bracket's base comprises flanges extending laterally from the bracket's axis for resisting moments imposed on the bracket.

5. The system of claim 3 wherein the one or more pressure vessels have a length along their axis which is subject to differential expansion and each bracket having sufficient lateral flexibility so that the brackets absorb at least the pressure vessel's differential expansion.

6. The system of claim 5 wherein the differential expansion is a least 0.1% of the pressure vessel length.

7. The system of claim 5 wherein the maximum flexibility of the web relative to the base is less than about 13 mm.

8. The system of claim 5 wherein the structure is a vehicle and the bracket having a decreasing stiffness from the base to the neck-mounting means is sufficiently stiff to resist inertial loads imposed by the pressure vessel yet sufficiently flexible to absorb the differential expansion.

9. The system of claim 8 wherein the system can accept loads imposed by the pressure vessels when subjected to inertial loads at about 20 g.

10. The system of claim 2 wherein the web is fitted with a notch and each neck-mounting means comprises a body, the body having
    a laterally extending profile for fitting correspondingly into the notch; and
    a bore adapted for mounting to the neck end of the pressure vessel,
    wherein said body is secured to the web.

11. The system of claim 10 wherein the body of each attachment is secured to the web with adhesive.

12. The system of claim 10 wherein the body of each attachment is secured to the web with one or more mechanical fasteners.

13. The system of claim 10 wherein the laterally extending profile further comprises an indentation for further engaging the notch and securing the body of the attachment to the web.

14. The system of claim 1 wherein each bracket comprises:
    a fiber-reinforced composite and unitary beam, the beam having an axis which is adapted to extend perpendicular to the axes of the one or more pressure vessels, and further comprising,
    a base adapted for mounting to the structure;
    a web extending from the base; and
    one or more neck mounting means in the web for receiving and mounting the neck end of each of the one or more pressure vessel so as to transfer load from the neck end of the pressure vessel into the web.

15. The system of claim 14 wherein each bracket beam further comprises a polygonal tubular section having at least two leg portions extending from the base, the tubular section having a hollow core and wherein the web extends from the tubular section, the web being spaced from the base by the tubular section.

16. A pressure vessel mounting bracket for mounting at least one end of at least one pressure vessel to a structure, each pressure vessel having an axis, the bracket comprising:
    a fiber-reinforced composite and unitary beam, the beam having an axis which is adapted to extend perpendicular to the axis of the pressure vessel, and further comprising,
    a base adapted for mounting to the structure;
    a web extending from the base; and
    one or more neck-mounting means in the web for receiving and mounting the neck end of each of the one or more pressure vessel so as to transfer load from the neck end of the pressure vessel into the web.

17. The mounting bracket of claim 16 wherein the pressure vessels exhibit differential expansion cycles along their axis, the beam profile providing sufficient flexibility perpendicular to the beam's axis so as absorb deflection resulting from the pressure vessel's differential expansion.

18. The mounting bracket of claim 17 wherein the beam profile further comprises a polygonal tubular portion having at least two leg portions extending from the base, the tubular section having a hollow core and wherein the web extends from the tubular section, the web being spaced from the base by the tubular section.

19. The mounting bracket of claim 18 wherein the web extends substantially co-linearly from one of the leg portions of the tubular portion.

20. The mounting bracket of claim 19 wherein the tubular portion and web have an "h" profile extending from the base.

21. The mounting bracket of claim 19 wherein the attachment means further comprises:
    a body, the body having
    a laterally extending profile for fitting correspondingly into the notch; and
    a bore adapted for mounting to the neck end of the pressure vessel,
    wherein said body is secured to the web.

22. The mounting bracket of claim 21 wherein the bore of the attachment is threaded for engaging to a threaded neck end of a pressure vessel.

23. The mounting bracket of claim 21 wherein the body of the attachment is formed as a clamp having in two halves further comprises:

a first half having a semi-circular bore;

a second half having a semi-circular bore so that when the first half and the second half are mated, a circular bore results which is adapted to accept the neck end of the a pressure vessel; and clamping means so that the first half and second half are urged together to sandwich and frictionally retain the neck end in the attachment.

24. The mounting bracket of claim 23 wherein the bore of the attachment frictionally engages the neck end of a pressure vessel.

25. The mounting bracket of claim 16 wherein neck-mounting means comprise:

one or more locating notches spaced along the beam corresponding to the spacing of the one or more pressure vessels; and for each notch attachment means adapted for securing to the neck end of a pressure vessel to the web.

26. The mounting bracket of claim 16 wherein the structure is a vehicle and the mounting bracket is provided at both neck ends of each pressure vessel, the mounting brackets having decreasing stiffness from the base to the neck-mounting means being sufficiently stiff to resist inertial loads imposed by the pressure vessel yet sufficiently flexible to absorb differential expansion.

27. The mounting bracket of claim 26 wherein the bracket can accept loads imposed by the pressure vessels when subjected to inertial loading at about 20 g.

28. A method of mounting one or more pressure vessels to a structure, the method comprising the steps of:

providing first and second fiber-reinforced composite brackets, each bracket having a base from which a web extends and one or more attachments formed in the web;

mounting a pressure vessel at a first neck end to an attachment of the first bracket and at a second end to an attachment of the second bracket so as to mount the pressure vessels to the brackets and to space the brackets apart so as to create a structurally rigid system; and mounting the spaced first and second brackets to the structure.

29. The method of claim 28 further comprising the step of transferring axial differential expansion of the pressure vessels into transverse flexible brackets.

30. The method of claim 28 wherein the structure is movable further comprising the step of transferring inertial loads of the pressure vessels into the brackets.

* * * * *